(12) United States Patent
Takano et al.

(10) Patent No.: US 7,039,548 B2
(45) Date of Patent: May 2, 2006

(54) MITER SAW FOR DISPLAYING ANGLE OF CUTTER BLADE CUTTING WORKPIECE

(75) Inventors: Nobuhiro Takano, Hitachinaka (JP); Eisaku Oka, Hitachinaka (JP); Hiromi Ozawa, Hitachinaka (JP); Yoshikazu Kawano, Hitachinaka (JP); Kenrou Ishimaru, Hitachinaka (JP); Tomoyuki Kawahara, Hitachinaka (JP); Hiroyuki Saitou, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 10/960,719

(22) Filed: Oct. 8, 2004

(65) Prior Publication Data

US 2005/0076760 A1    Apr. 14, 2005

(30) Foreign Application Priority Data

Oct. 8, 2003 (JP) .......................... P 2003-350157
Jul. 26, 2004 (JP) .......................... P 2004-217997

(51) Int. Cl.
*G01C 1/00* (2006.01)
*G01B 3/56* (2006.01)
*G01B 5/24* (2006.01)

(52) U.S. Cl. ..................... 702/151; 33/1 N; 83/522.17; 83/522.25

(58) Field of Classification Search ..................... None
See application file for complete search history.

(56) References Cited

U.S. PATENT DOCUMENTS 4,641,557 A    2/1987  Steiner et al.
4,754,276 A *  6/1988  Carlson et al. ........ 340/870.37
5,249,496 A   10/1993  Hirsch et al.
5,394,166 A *  2/1995  Shimada ....................... 345/98
2001/0000856 A1* 5/2001  O'Banion .................... 83/76.9
2002/0182979 A1* 12/2002  Griffiths .......................... 451/9

FOREIGN PATENT DOCUMENTS

DE    198 32 984      1/1999
JP     8-336802     12/1996
JP    2000-254817    9/2000

* cited by examiner

*Primary Examiner*—Marc S. Hoff
*Assistant Examiner*—Manuel L. Barbee
(74) *Attorney, Agent, or Firm*—Antonelli, Terry, Stout and Kraus, LLP.

(57) ABSTRACT

A miter saw for displaying angle of a cutter blade cutting the workpiece. The miter saw has a base mounting a workpiece thereon, a movable member movably supported to the base, and a cutting unit connected to the movable member for supporting the cutter blade. A positioning portion is associated with the movable member and provides a predetermined nominal position of the movable member with respect to the base. The predetermined nominal position includes a reference position and other positions labeled angle. A detector detects the position of the movable member with respect to the base. A processor sets an angle between the reference position and the predetermined nominal position as a displayed moving amount when the movable member is positioned at the predetermined nominal position. Otherwise, the processor computes the moving amount based on the output signal from the detector.

41 Claims, 14 Drawing Sheets

MITER SAW FOR DISPLAYING ANGLE OF CUTTER BLADE CUTTING WORKPIECE

CROSS-REFERENCE TO RELATED APPLICATIONS

This application is based upon and claims the benefit of priorities from Japanese Patent Application No. 2003-350157 filed on Oct. 8, 2003 and Japanese Patent Application No, 2004-217997 filed on Jul. 26, 2004, the entire disclosures of which are hereby incorporated by references in its entirety.

BACKGROUND OF THE INVENTION

1. Field of the Invention

The present invention relates to a miter saw capable of adjusting the angle of a circular saw blade in relation to its base and the angle of the circular saw blade in relation to a contact surface of a fence fixed to the base.

2. Description of the Related Art

Conventional miter saws include a base for supporting a workpiece, a cutter blade portion for rotatably supporting a circular saw blade, and a supporting unit for pivotably supporting the circular saw blade about a pivoting shaft that is substantially parallel to the axis of the circular saw blade. The supporting unit can be inclined with respect to the base so that the angle formed by the side surfaces of the circular saw blade and the top surface of the base can be adjusted.

Further, if the miter saw is provided with a turntable along with the base for supporting a workpiece, the turntable is coupled with the supporting unit so that the angle of the side surfaces of the circular saw blade in relation to the top surface of the base can be adjusted.

Further, when the angle of the side surfaces of the circular saw blade can be adjusted with respect to the contact surface of the fence fixed to the base, a support for pivotably supporting the cutter blade portion is coupled with the turntable rotatably provided on the top surface of the base so that the support can rotate about the rotational axis of the turntable.

The user of the miter saw can cut the workpiece supported on the top surface of the base in a slanting direction by adjusting the angle of the side surfaces of the circular saw blade in relation to the top surface of the base. And the user can cut a workpiece at a slant in relation to the side surface of the workpiece opposing the contact surface of the fence in a vertical direction by adjusting the angle of the side surfaces of the circular saw blade in relation to the contact surface of the fence. The user performs these adjustments while referencing graduated scales integrally provided on the supporting unit and the base or turntable for indicating degree of tilt and degree of rotation. Hence, the user of this type of miter saw can be aware of the inclination angle and rotation angle by viewing the graduated scales. However, it is not easy to learn the angles of inclination and rotation instantaneously. Further, due to space restrictions, there is a restriction on the number of angle values that can be inscribed on the graduated scales. Hence, the user cannot easily learn the current angles of inclination and rotation instantaneously for angular values other than those inscribed on the graduated scales, leading to a potential drop in work efficiency.

Japanese unexamined patent application publication No. 2000-254817 discloses a miter saw having detecting means for detecting the inclination angle of a rotary face of a circular saw relative to a base, and a display for displaying the angle detected by this detecting means.

The miter saw disclosed in Japanese unexamined patent application publication No. 2000-254817 has a detection shaft coupled with the rotating shaft that supports the rotary face of the circular saw and detects the rotation angle of the detection shaft. Hence, the miter saw detects the rotation angle by counting the rotation angle of the detection shaft using a rotary encoder, for example, and displays this detected rotation angle.

The miter saw described above detects the inclination angle for the rotary face of the circular saw relative to the top surface of the base and displays this detected angle on the display, enabling the user to know the current inclination angle instantaneously. However, the displayed inclination angle is always detected based on an initial reference position. The rotation angle of the turntable with respect to the base is similarly always detected and displayed based on an initial reference position.

Usually, the miter saw is configured so that a portion of the base or turntable mechanically engages with the supporting unit to fix the circular saw. Therefore, the saw's sides can form a right angle to the top surface of the base, the most frequently used position, or form an inclination angle of 45° to the top surface of the base, the second most commonly used position.

The miter saw is further configured such that the base and a portion of the turntable engage together mechanically to fix the rotational position of the turntable with respect to the base. Therefore, the side surfaces of the circular saw blade can form a right angle to the contact surface of the fence, the most commonly used position, or form a rotation angle of 15°, 30°, 45°, or 60° with the contact surface of the fence, the next most commonly used positions.

Further, even when a display is provided for displaying the detected angles, the display may not always be used due to malfunctions, various working conditions, or the user's preference. Hence, a graduated scale is also often provided along with the supporting unit or base for indicating commonly used inclination angles and rotation angles as well as the display.

In the miter saw having the above construction, the inclination angle and rotation angle is always detected based on a preset reference point. Therefore, the angle displayed on the display often deviates from the angle determined by a mechanical engagement at a predetermined position or an angle indicated by the graduated scale due to errors in detection or imprecision in the dimensions of the miter saw.

For example, in a miter saw having a maximum inclination range of 45°, the display may show 44° or 46° although the user has tilted the supporting unit to 45°. Further, when the base and turntable are mechanically engaged at such predetermined angles as 15°, 30°, 45°, or 60°, the display may show a different angle from these settings. When this happens, the user is provided with multiple values for the angle, inviting confusion that may lead to a decline in working efficiency.

Further, even when the supporting unit is mechanically engaged with the base or turntable at a predetermined position, vibrations or other external forces may cause the angle displayed on the display to change undesirably.

If the angles of inclination and rotation are detected over a broad range, errors in the detected angle may be large, since the angles are always detected bated on a preset reference position. Hence, it is difficult to display accurate angles of inclination and rotation.

SUMMARY OF THE INVENTION

In view of the foregoing, it is an object of the present invention to provide a miter saw that can provide suitable angle information to a user.

It is another object of the present invention to provide a miter saw capable of reducing errors in detecting angles during angle adjustments.

The present invention provides a miter saw comprising: a base for mounting a workpiece thereon; a movable member supported to the base and movable relative to the base; a cutter blade portion connected to the movable member for rotatably supporting a circular saw blade to cut the workpiece; a positioning portion associated with the movable member and providing a predetermined nominal position of the movable member with respect to the base, the predetermined nominal position including a reference position and a specific position; a detector for producing an output signal indicative of a position of the movable member with respect to the base; a display for displaying a moving amount of the movable member from the reference position; and a processor for setting an angle between the reference position and the predetermined nominal position as the moving amount when the movable member is positioned at the predetermined nominal position. The processor computes the moving amount based on the output signal from the detector when the movable member is positioned at a position other than the predetermined nominal position. The processor sends data indicative of the moving amount to the display.

The present invention provides a miter saw comprising: a base for mounting a workpiece thereon; a movable member supported to the base and movable relative to the base; a cutter blade portion connected to the movable member for rotatably supporting a circular saw blade to cut the workpiece; a positioning portion associated with the movable member and providing a predetermined nominal position of the movable member with respect to the base, the predetermined nominal position including a reference position and a specific position; a detector for producing an output signal indicative of a position of the movable member with respect to the base; a display for displaying a moving amount of the movable member from the reference position; a storage for storing a table providing a relationship between the predetermined nominal position and an output signal of the detector when the turntable is positioned at the predetermined nominal position; and a processor for computing a measured angle from the reference position on the basis of the output signal from the detector and searching the predetermined nominal position from the table based on the measured angle. The processor sends data indicating the searched predetermined nominal position to the display.

BRIEF DESCRIPTION OF THE DRAWINGS

The above and other objects, features, and advantages of the invention will become more apparent from reading the following description of the preferred embodiments taken in connection with the accompanying drawings in which.

DESCRIPTION OF THE PREFERRED EMBODIMENTS

Figure 1:
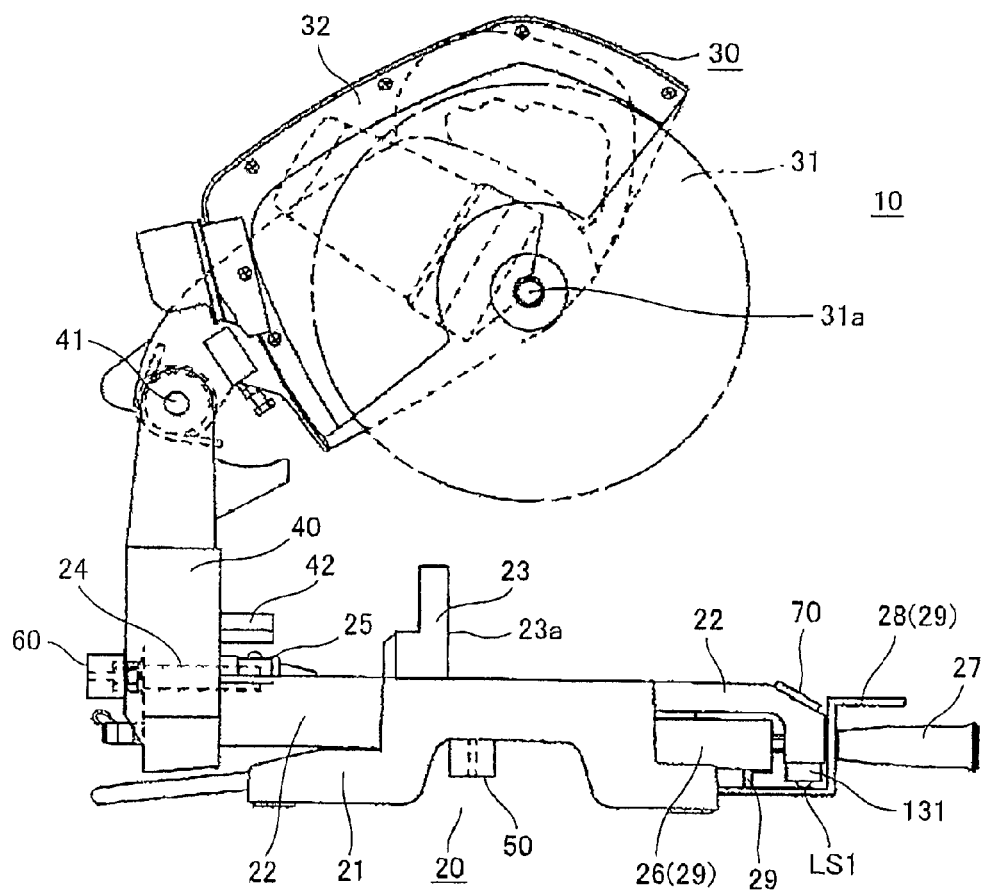
FIG. 1 is a side view showing a miter saw according to a first embodiment of the present invention.

Next, a miter saw according to a preferred embodiment of the present invention will be described while referring to the accompanying drawings. FIG. 1 shows a miter saw 10 according to the preferred embodiment of the present invention.

As shown in FIG. 1, the miter saw 10 includes a base unit 20 that is disposed on a flat surface for supporting a workpiece made of wood on the top surface thereof; a cutting unit 30 for cutting the workpiece; and a supporting unit 40 for supporting the cutting unit 30 in a manner that the cutting unit 30 can be moved from an upper position to a lower position to cut down the workpiece. The supporting unit 40 can also be tilted with respect to the top surface of the base unit 20.

The base unit 20 includes a base 21 placed directly on the flat surface, a turntable 22 that can rotate angularly with respect to the base 21, and a fence 23 having a contact surface 23a that contacts a side surface of a workpiece on the top surface of the base 21 for holding the position of the workpiece. The turntable 22 has a rotational axis substantially orthogonal to the top surface of the base 21, and is capable of rotating about the rotational axis within a horizontal plane that includes the top surface of the base 21. A potentiometer 50 is provided between the turntable 22 and the base 21 for detecting the rotation angle of the turntable 22 with respect to the base 21. In the following description, the front side of the miter saw refers to the direction in which the contact surface 23a of the fence 23 faces; the bottom side of the miter saw refers to the side facing the flat surface on which the base is placed; and the left-to-right direction refers to the direction along which the fence 23 extends.

The cutting unit 30 includes a cutter blade 31 for cutting the workpiece, the cutter blade 31 having a rotational axis 31a; and a holder 32 for supporting the cutter blade 31 in order to rotate the cutter blade 31 about the rotational axis 31a.

The supporting unit 40 is coupled to the turntable 22 movably. The turntable 22 has a rotational axis 24 integral therewith. The supporting unit 40 has one end which is pivotably coupled to the rotational axis 24 in order to tilt about the rotational axis 24 with respect to the turntable 22. On the other end of the supporting unit 40, a pivoting axis 41 extends substantially parallel to the rotational axis 31a of the cutter blade 31. The cutting unit 30 is joined to the supporting unit 40 through the rotational axis 24 so that the cutting blade 31 can pivot about the pivoting axis 41. A potentiometer 60 is provided on the turntable 22 and the supporting unit 40 for detecting the inclination angle of the supporting unit 40 with respect to the turntable 22.

A tilting guide 42 is formed near one end of the supporting unit 40. On the other hand, a bolt 25 is provided near to the supporting unit 40 on the turntable 22. In this embodiment, the tilting guide 42 and the bolt 25 are provided on the supporting unit 40 for restricting the inclination range of the supporting unit 40 with respect to the turntable 22. When the supporting unit 40 is tilted with respect to the turntable 22, the tilting guide 42 contacts a head of the bolt 25. The bolt 25 and the tilting guide 42 restrict the supporting, unit 40 from tilting past a predetermined angle range.

Figure 3:
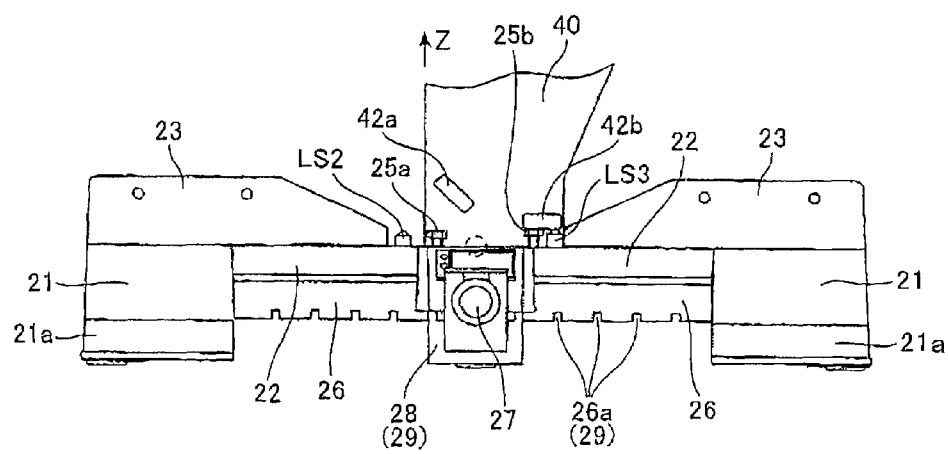
FIG. 3 is an enlarged side view showing a first inclination state of the miter saw in FIG. 1.

Next, the base unit 20 will be described in greater detail. The base unit 20 also includes a rotation supporting unit 26, a handle 27, and a lock lever 28. The rotation supporting unit 26 is provided on the base 21 and supports the turntable 22 so the turntable 22 can rotate with respect to the base 21. The rotation supporting unit 26 has a plurality of recesses 26a, as shown in FIG. 3, formed on the bottom side thereof. The plurality of recesses 26a are arranged at predetermined intervals such as 7.5°.

In this embodiment, the recesses 26a are formed at 7.5° intervals, i.e., 0°, 7.5°, 15°, 22.5°, 30°, 37.5°, and 45°. The recesses are given the corresponding label indicating of the angle from 0° such as 0°, 7.5°, 15°, 22.5°, 30°, 37.5°, and 45°, respectively.

However, the recess 26a is not always formed at the angle position which is the exactly same as the labeled angle position from 0° due to the manufacture errors. In other words, even if the recess 26a is labeled 30°, the recess 26a labeled 30° is not always positioned at an exactly 30° angle from 0° due to the manufacture errors and manufacturing accuracy, for example. Accordingly, even if the recess 26a labeled 30° may be provided at any different angle position from the exact 30° position such as 29.5° or 30.5°, this recess is referred as the recess labeled 30° and considered to be positioned at 30° angle from 0°, as long as the recess is labeled 30°. The same thing applies to other recesses labeled the angle. The above angle position of the recess is referred to a predetermined nominal position in the present invention.

The handle 27 is used for rotating the turntable 22 with respect to the base 21. The lock lever 28 is provided on the turntable 22 and includes an engaging unit 29 for engaging with one of the plurality of recesses 26a (see FIG. 3). A limit switch LS1 is provided below the turntable 22 and above the lock lever 28. When pressed downward, the lock lever 28 disengages the engaging unit 29 from the recess 26a, enabling the turntable 22 to rotate. The limit switch LS1 is turned on when the lock lever 28 is engaged in one of the recesses 26a. And the limit switch LS1 is turned off when the lock lever 28 is not engaged in the recess 26a.

A display 70 is provided on the front surface (the right side in FIG. 1) of the turntable 22 for displaying the rotation angle of the turntable 22 from a reference position and the inclination angle of the supporting unit 40 with respect to the top surface of the base unit 20. In this embodiment, the reference position is defined as the origin point for measuring an angle of inclination and/or rotation of a movable member such as the turntable 22 and the supporting unit 40 with respect to the base 21. For example, if the movable member is the turntable 22, the reference position is generally the position at which the side faces of the cutter blade 31 is positioned perpendicularly to the contact surface 23a of the fence 23. If the movable member is the supporting unit 40, the reference position is a vertical direction which is a substantially parallel to the normal to the top surface of the turntable 22.

Next, the display 70 will be described in greater detail with reference to FIG. 2.

Figure 2:
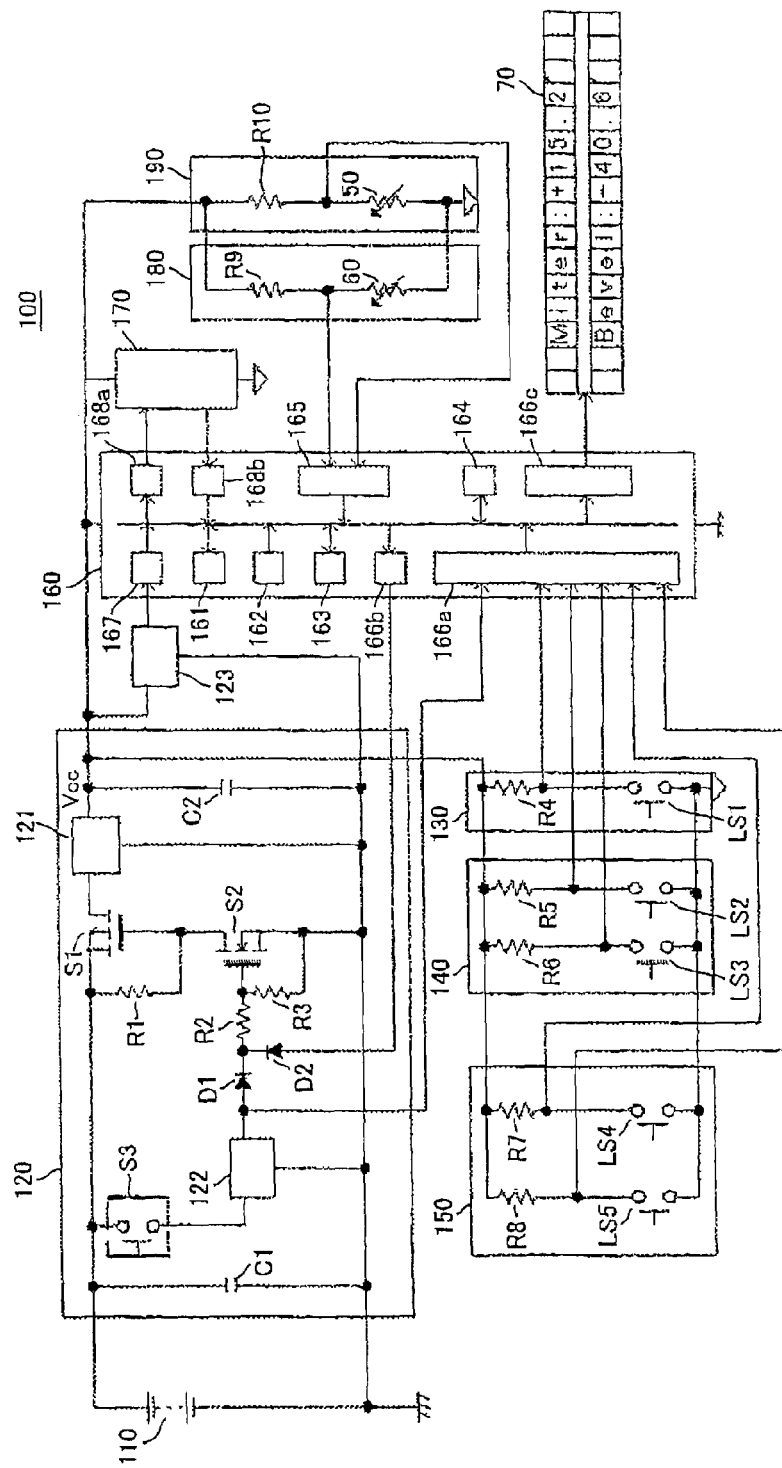
FIG. 2 is a circuit diagram showing a controller for a display used in the miter saw of the preferred embodiment.

FIG. 2 shows a controller 100 for controlling the display 70. The controller 100 includes a battery 110, a constant voltage circuit 120, a rotation position sensor 130, an inclination position sensor 140, a display reset unit 150, a microcomputer 160, a memory 170, an inclination angle sensor 180, and a rotation angle sensor 190.

The constant voltage circuit 120 includes a 3-terminal regulator 121, switching elements S1 and S2, a reset IC 122, a switch S3, diodes D1 and D2, resistors R1–R3, and capacitors C1 and C2. When the switching element S1 is turned on, the 3-terminal regulator 121 outputs power supplied from the battery 110 at a constant voltage Vcc.

The on/off status of the switching element S1 is switched according to the on/off status of the switch S3 and the switching element S2. In other words, when the switching element S1 is off, if the user switches the switch S3 on and the output voltage from the battery 110 exceeds a predetermined value, the switching element S1 is turned on by the reset IC 122 and the switching element S2. Accordingly, power is supplied from the constant voltage circuit 120 to the microcomputer 160. At the same time, the microcomputer 160 outputs a signal for continuing the power supply.

On the other hand, when the switch S3 is switched on while the switching element S1 is on, the microcomputer 160 responds by outputting a signal for turning off the switching element S1, terminating the power supply to the microcomputer 160.

The rotation position sensor 130 includes a resistor R4 and a limit switch LS1. The rotation position sensor 130 detects whether the turntable 22 is in any one of the plurality of recesses 26a. In other words, the rotation position sensor 20 detects that the turntable 22 is engaged in one of the recesses 26a. In this embodiment, each of the recesses 26a is formed in 7.5° increments from the reference position. Generally, the initial reference position is the position in order that the side surface of the cutter blade 31 will be positioned at a right angle with respect to the contact surface 23a of the fence 23.

The inclination position sensor 140 includes resistors R5 and R6, and limit switches LS2 and LS3. The inclination position sensor 140 detects whether the side surfaces of the cutter blade 31 are at a predetermined angular position with respect to the top surface of the base 21. In other words, the inclination position sensor 140 detects whether the tilting guide 42 and bolts 25 are tilted as far as a maximum inclination angle.

The display reset unit 150 includes resistors R7 and R8, and limit switches LS4 and LS5. The display reset unit 150 functions for resetting the displayed inclination and/or rotation angles to zero. According to the display reset unit 150, the user can select any angular position as the reference position for measuring an angle to the desired position. Therefore, the display 70 displays an angle to any angular position from the reference position which the user selects.

The microcomputer 160 includes a CPU 161, a ROM 162, a RAM 163, a timer 164, an A/D converter 165, output ports 166a, 166b, and 166c, a reset input port 167, and memory ports 168a and 168b. The microcomputer 160 uses the timer 164 to receive signals from the inclination angle sensor 180 and rotation angle sensor 190 via the A/D converter 165 at fixed intervals; to receive signals from the rotation position sensor 130, inclination position sensor 140, and display reset unit 150 via the input port 168*a*; and to receive a signal from the memory 170 via the input port 168*b* The microcomputer 160 calculates the inclination and rotation angles based on the signals from the sensors 130, 140, 150, 180, and 190 to output the calculated angles to the display 70 via the output port 166*c*. The microcomputer 160 also outputs a signal for turning off the switching element S1 in response to an output signal from the reset IC 122 to control the power supply from the battery 110. The microcomputer 160 also outputs the calculated results for the inclination and rotation angles to the memory 170.

The memory 170 is configured of an EEPROM, for example, and functions to store the inclination angle and rotation angle outputted from the microcomputer 160 and the corresponding output value of the inclination and rotation angle sensors 180 and 190. In addition, the memory 170 stores the table including the relationship between each of the recesses 26*a* and the corresponding signal value from the inclination and rotation angle sensors 180 and 190. The memory renews the table in response to the output of the microcomputer 160.

A reset IC 123 is provided between the output terminal of the 3-terminal regulator 121 and the microcomputer 160 to transmit a low level reset signal to the microcomputer 160 via the reset input port 167 depending on an output voltage from the 3-terminal regulator 121 to reset the microcomputer 160.

The inclination angle sensor 180 includes a resistor R9 and the potentiometer 60. The potentiometer 60 is provided for detecting the amount of inclination of the supporting unit 40 from the vertical direction, which is substantially perpendicular to the top surface of the turntable 22.

The rotation angle sensor 190 includes a resistor R10 and the potentiometer 50. The potentiometer 50 is provided for detecting the amount of rotation of the turntable 22 with respect to the base 21. In this embodiment, the potentiometer 50 detects the rotational amount of the turntable 22 from the reference position.

Since the resistance values of the potentiometer 60 and the potentiometer 50 change linearly in synchronization with angular increments, the voltages outputted from the potentiometer 60 and potentiometer 50 change linearly depending on the angle increments.

Further, when the support unit 40 is positioned at one of the plurality of predetermined inclination angles or rotation angles, the memory 170 stores a table showing correspondences between voltages outputted from the potentiometer 60 and potentiometer 50 and each of the plurality of predetermined inclination angles and rotation angles. In this embodiment, the plurality of recesses 26*a* are formed on the base 21 side at 7.5° intervals. Each of the recesses 26*a* corresponds to one of predetermined rotation angles. The predetermined inclination angles refer to 0°, 15°, 30°, and 45°, which are defined by the supporting unit 40 and the normal to the top surface of the turntable 22.

The display 70 is configured of a liquid crystal display, for example, and functions to display the inclination angle and rotation angle which is computed by the microcomputer 160.

Next, inclination states of the miter saw 10 will be described with reference to FIGS. 3 and 4.

In FIG. 3, the supporting unit 40 is positioned at a right angle to the top surface of the base 21, and the side surfaces of the cutter blade 31 are likewise oriented at right angles to the top surface of the base 21. In this embodiment, the above orientation of the supporting unit 40 corresponds to the reference position. In FIG. 4, the supporting unit 40 is positioned at its maximum inclination angle from the reference position, so that the side surfaces of the cutter blade 31 form an angle of 45° from the normal direction to the top surface of the base 21.

Figure 4:
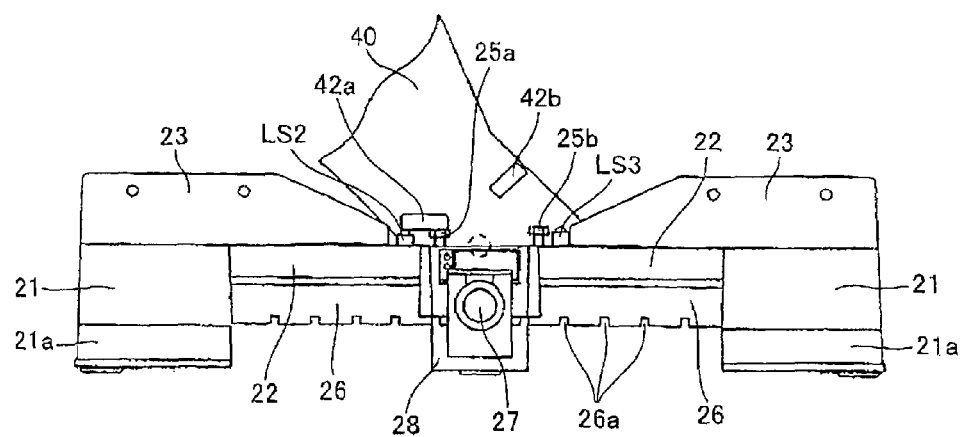
FIG. 4 is an enlarged right side view showing a second inclination state of the miter saw in FIG. 1.

As shown in FIGS. 3 and 4, feet 21*a* are attached to the bottom of the base 21. And the plurality of recesses 26*a* are formed in the rotation supporting unit 26 to correspond to a plurality of predetermined angles. The engaging unit 29 is retained in one of the plurality of recesses 26*a*. The bolts 25 prevent the side surfaces of the cutter blade 31 from inclining past 45° from the reference position, that is, the vertical direction in this embodiment. Specifically, the bolts 25 can engage with the tilting guide 42 of the supporting unit 40 for restricting the amount that the supporting unit 40 inclines. As shown in FIG. 3, the tilting guide 42*b* and the bolt 25*b* on one side contact with each other when the side surfaces of the cutter blade 31 are oriented at a right angle from the vertical reference direction Z. As shown in FIG. 4, the tilting guide 42*a* and the bolt 25*a* on the other side contact with one another when the supporting unit 40 is positioned at the maximum inclination angle from the vertical reference direction Z such that the side surfaces of the cutter blade 31 form an angle of 45° with the top surface of the turntable 22.

As shown in FIGS. 3 and 4, the limit switches LS2 and LS3 are provided on the turntable 22 near the bolts 25 and protrude slightly above the heads of the bolts 25 for detecting the maximum inclination position. The limit switches LS2 is turned on by the tilting guide 42*a* when the tilting guide 42*a* contacts with the corresponding bolt 25*a*, as shown in FIG. 4. The limit switches LS3 is turned on by the tilting guide 42*b* when the tilting guide 42*b* contacts with the corresponding bolt 25*b* as shown in FIG. 3. Specifically, the limit switch LS3 turns on when the supporting unit is at the vertical reference position shown in FIG. 3. And the limit switch LS2 turns on when the support unit 40 is at the maximum inclination position 45° shown in FIG. 4.

Next, rotation states of the turntable 22 in the miter saw 10 of this embodiment will be described with reference to FIGS. 5 and 6.

Figure 5:
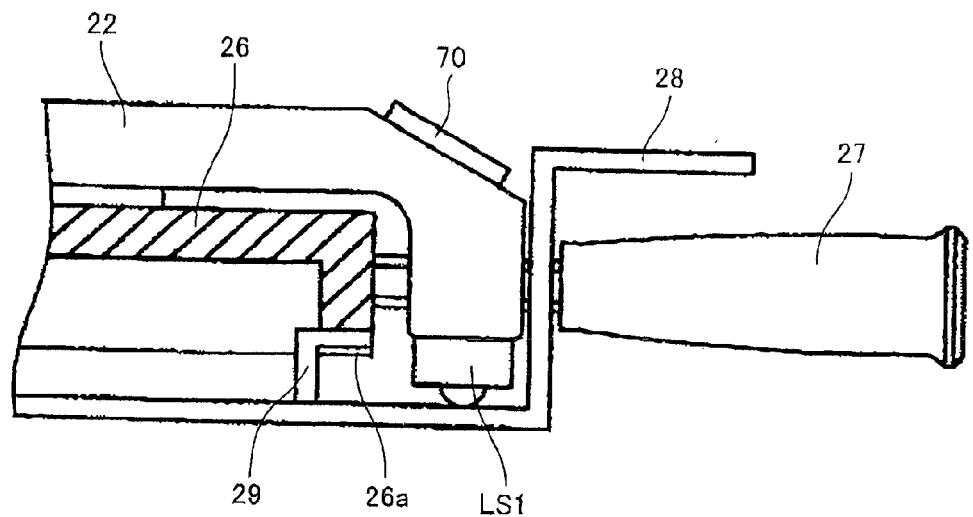
FIG. 5 is an enlarged cross-sectional view showing a first rotation state of the miter saw in FIG. 1.

FIG. 5 shows the engaging unit 29 of the lock lever 28 engaged with one of the recesses 26*a* formed in the base 21. FIG. 6 shows the engaging unit 29 is disengaged from the recess 26*a* by pressing the lock lever 28 downward.

Figure 6:
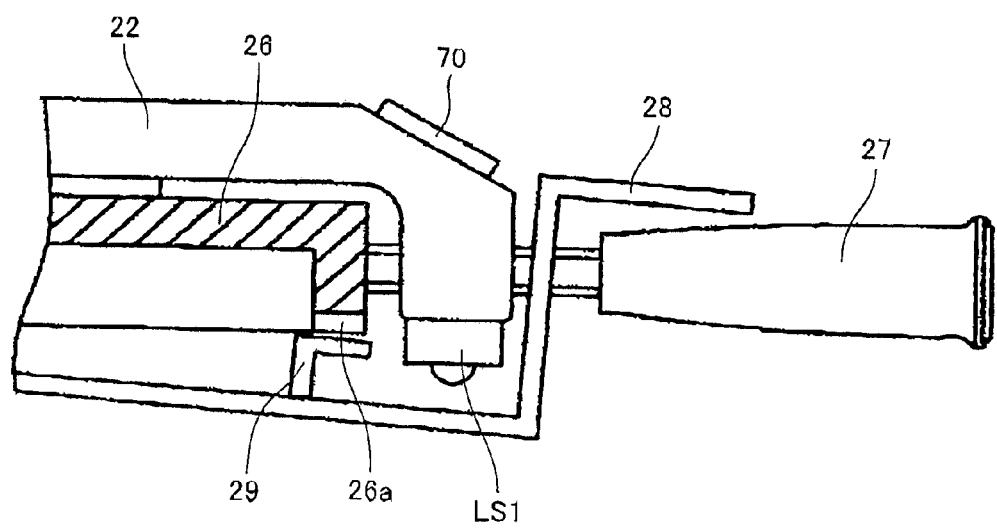
FIG. 6 is an enlarged cross-sectional view showing a second rotation state of the miter saw in FIG. 1.

As shown in FIGS. 5 and 6, the limit switch LS1 is provided on the bottom surface near the front end of the turntable 22 (the right side in the drawing) and protrudes downward. As shown in FIG. 5, the limit switch LS1 is on when the lock lever 28 is positioned upward through its own elastic force and the engaging unit 29 provided integrally on the lock lever 28 is engaged with one of the plurality of recesses 26*a* formed in the rotation supporting unit 26 of the base 21 (see FIGS. 3 and 4). The limit switch LS1 is configured to turn off when the engaging unit 29 disengages from the recess 26*a* as the lock lever 28 is pushed downward, as shown in FIG. 6. In this embodiment, the limit switch LS1 is turned off when the lock lever 28 is not in any one of the recesses 26*a*. For example, this condition means that the turntable 22 is out of the predetermined position of the base 21.

The recesses 26*a* are formed at intervals of 7.5° in the rotational direction of the turntable 22, for example. Rotation of the turntable 22 is not allowed when the engaging unit 29 is engaged in one of the recesses 26*a*. In this embodiment, the turntable 22 can easily be fixed at the relatively commonly used rotation angles of 15°, 30°, and 45° from the reference position.

To rotate the turntable 22 with respect to the base 21, the user grips the handle 27 and, with the same hand, pushes down the lock lever 28 to disengage the engaging unit 29 from the recess 26a, as shown in FIG. 6. In this state, the user can move the handle 27 to rotate the turntable 22 to a desired position with respect to the base 21.

Owing to the force of gravity, the turntable 22 does not easily rotate with respect to the base 21, even when the engaging unit 29 is not engaged in one of the recesses 26a. Therefore, cutting operations can still be performed when the engaging unit 29 and recess 26a are not engaged. However, another mechanism for fixing the turntable 22 with respect to the base 21 can be provided for performing cutting operations on a workpiece when the engaging unit 29 is not engaged in one of the recesses 26a.

Figure 7:
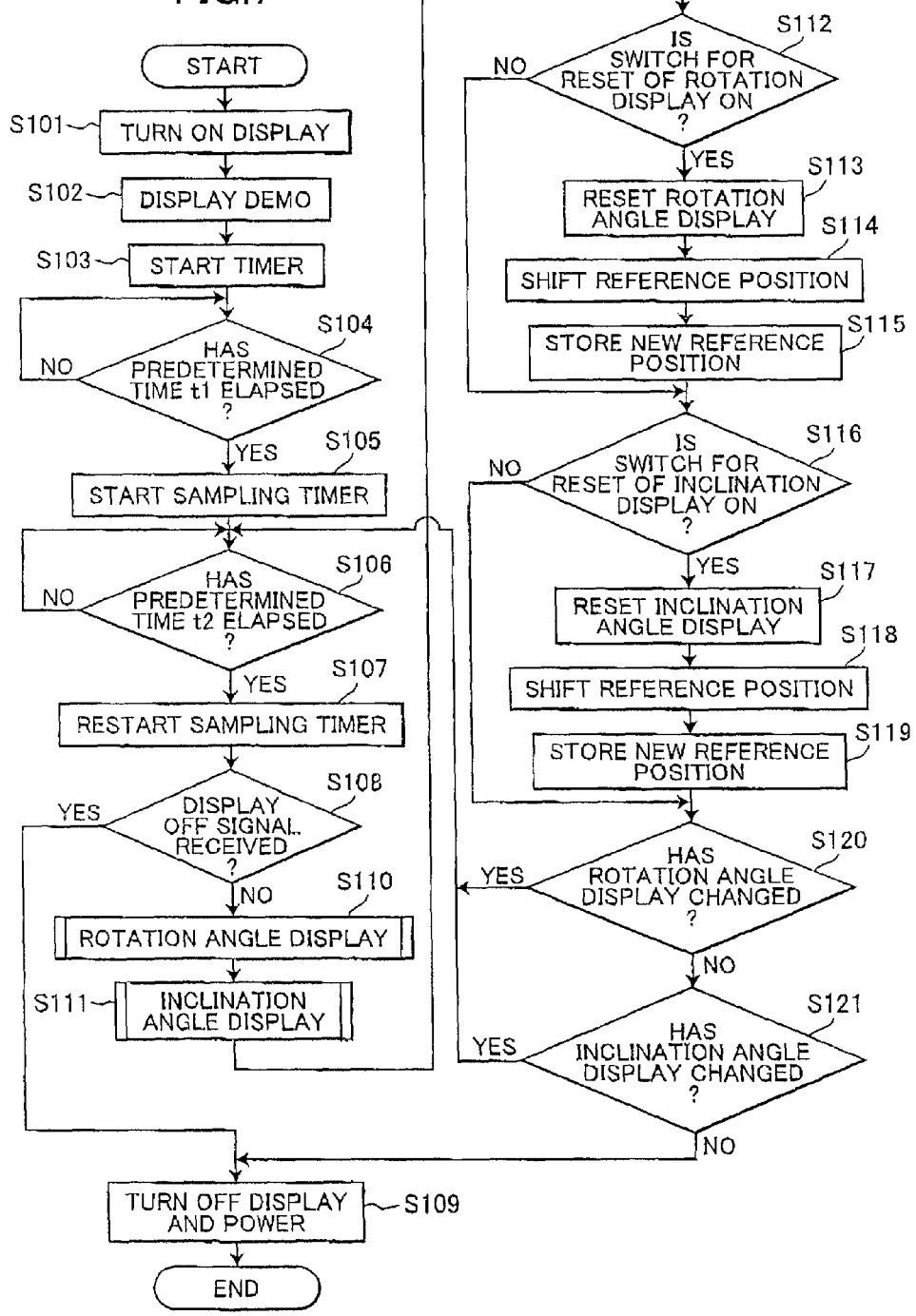
FIGS. 7, 8, and 9 are flowcharts illustrating control operations for the display in FIG. 2.

Next, the process for displaying the inclination angle and rotation angle of the miter saw 10 will be described with reference to FIG. 7.

When the user switches on the switch S3, the reset IC 122 turns on the switching element S1 after the voltage of the battery 110 exceeds a first predetermined value. A predetermined fixed voltage is applied to the microcomputer 160. The microcomputer 160 then outputs a signal for continuing the power supply from the output port 166b, thereby maintaining the on state of the switching element S1 and enabling the display 70 to display (S101).

Next, the microcomputer 160 outputs a signal via the output port 166c for displaying a demo screen on the display 70 (S102). Possible examples of this demo screen are the model name of the miter saw or a greeting. This screen can enhance the user's fondness for the miter saw 10. It should be noted that the demo screen may be skipped depending on the application of the miter saw 10. Simultaneously, the microcomputer 160 starts the timer 164 (S103).

After the demo screen is displayed in S102, the microcomputer 160 determines whether a predetermined time t1 has elapsed after the timer 164 began counting (S103). If the time t1 has not elapsed, then the display of the demo screen is maintained on the display 70 (S1O4:NO). When it is determined in S104 that the time t1 has elapsed (S104:YES), the microcomputer 160 starts a sampling timer for detecting angular display data (S105). Next, the microcomputer 160 determines whether a time t2 has elapsed after the sampling timer was started (S106). If the microcomputer 160 determines that the time t2 has elapsed (S106:YES), then the sampling timer is reset and restarted (S107). However, if the microcomputer 160 determines in S106 that the time t2 has not elapsed, then the process loops back to S106 until the time t2 has elapsed.

Next, the microcomputer 160 detects signal output from the reset IC 122 with the input port 166a and determines whether the user has operated the switch S3 for turning off the display 70 (S108). If the switch S3 has been operated, a high signal is inputted into the input port 166a. Accordingly, the microcomputer 160 determines that the user operated the switch S3 to turn off the display 70 (S108. YES), and the microcomputer 160 outputs a signal via the output port 166c for turning off the display 70. At the same time, the microcomputer 160 outputs a signal via the output port 166b for halting power supply to the microcomputer 160, thereby turning off the switching element S1 (S109).

If a low signal has been inputted into the input port 166a in S108, then the microcomputer 160 determines that the user has not operated the switch S3 for turning off the display 70. Then, the microcomputer 160 advances to a rotation angle display procedure (S110) and an inclination angle display procedure (S111) sequentially. If the microcomputer 160 determines that the switch S3 is off (S108: NO), the microcomputer 160 advances to the rotation angle display procedure (S110). The rotation angle display procedure (S110) is to calculate and display a rotational amount of the turntable 22 from the reference position, that is, an angle from the reference position to the actual angular position of the turntable 22 with respect to the base 21. The inclination angle display procedure (S111) is to calculate and display a tilting amount of the supporting unit 40 from the vertical reference position, that is, an angle from the vertical reference position to the inclined turntable 22.

Figure 8:
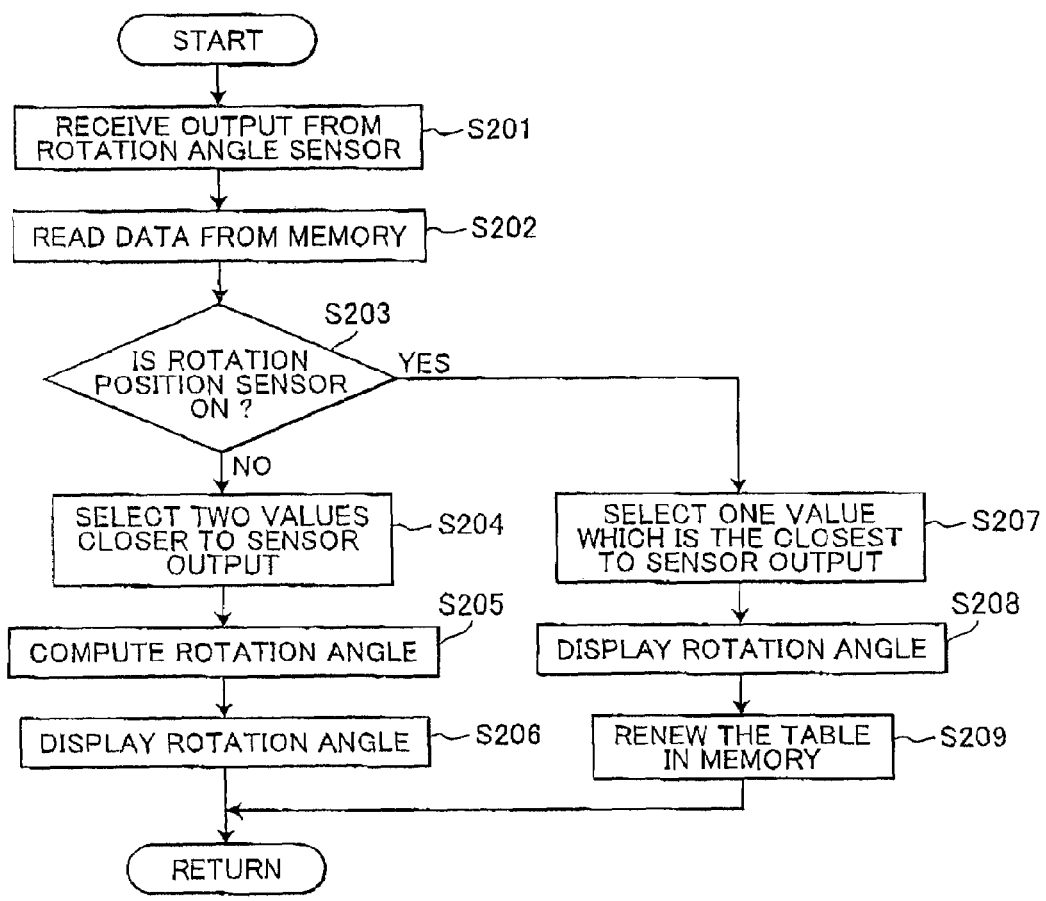

The details of the rotation angle display procedure will be described referring to FIG. 8. Referring to FIG. 8, the microcomputer 160 receives voltage data from the rotation angle sensor 190 based on output from the potentiometer 50 through the A/D converter 165 (S201). Next, voltage data of the rotation angle sensor 190 corresponding to the recesses 26a is read from the memory 170 (S202). An output from the rotation position sensor 130 is read via the input port 168a for determining whether the limit switch LS1 has been turned on. In other words, the microcomputer 160 determines whether the engaging unit 29 is retained in one of the recesses 26a based on the output from the rotation position sensor 130 (S203).

Here, the predetermined angular data corresponding to the recesses 26a stored in the memory 170 is output voltage of the rotation angle sensor 190 for 7.5°, 15°, 22.5°, . . . , respectively.

The microcomputer 160 determines that the engaging unit 29 is not retained in any of the recesses 26a when the limit switch LS1 is not on in S203 (S203:NO). Therefore, the microcomputer 160 uses correspondences between output voltage values from the rotation angle sensor 190 and predetermined rotation angles such as 7.5°, 15°, 22.5°, . . . , stored in the memory 170, and then calculates the rotation angle based on a voltage value outputted from the rotation angle sensor 190. The microcomputer 160 displays this rotation angle, i.e., rotation amount on the display 70.

The above calculation of the rotation angle will be described in detail. To calculate the rotation angle, the microcomputer 160 compares various voltage data in the memory 170 to the output voltage from the rotation angle sensor 190 and selects two predetermined positions from the memory 170 (S204). The predetermined positions satisfy the following conditions. One of them is a first set of a voltage value which is smaller than and the closest to the output voltage of the rotation angle sensor 190 and the corresponding first angular position. The other of them is a second set of a voltage which is more than and the closest to the output voltage of the rotation angle sensor 190 and the corresponding second angular position. The microcomputer 160 then uses a linear approximation method with the two sets of data to calculate the rotational amount of the turntable 22 (S205). It should be noted that the microprocessor 160 can use any type of approximation method to obtain the rotational amount of the turntable 22 in addition to the linear approximation method. The microcomputer 160 then sends the data indicating of the calculated rotation amount of the turntable 22 to the display 70 (S206). The microcomputer 160 then advances to S111.

However, the microcomputer 160 determines that the engaging unit 29 is retained in one of the recesses 26a corresponding to a predetermined rotation angle when the limit switch LS1 is on in S203. The microcomputer 160 then selects the predetermined rotation angle among the data read from the memory 170, and displays the selected rotation angle on the display 70 (S208).

To calculate the rotation angle in this case, the microcomputer 160 compares various voltage data in the memory 170 to the output voltage from the rotation angle sensor 190. The microcomputer 160 selects the predetermined angular data from the memory 170 that is the nearest to the output voltage from the rotation angle sensor 190 and displays the angle of this predetermined angular data as the rotation angle (S208).

After completing the process in S208, the microcomputer 160 sends the output voltage from the rotation angle sensor 190 and the corresponding predetermined position in the memory 170 via the output port 166a (S209). In other words, the microprocessor 160 renews the table including the correspondence between the predetermined positions and the corresponding output voltage data of the rotation angle sensor 190 (S209) The microprocessor 160 then advances to S111 (See FIG. 7).

Figure 9:
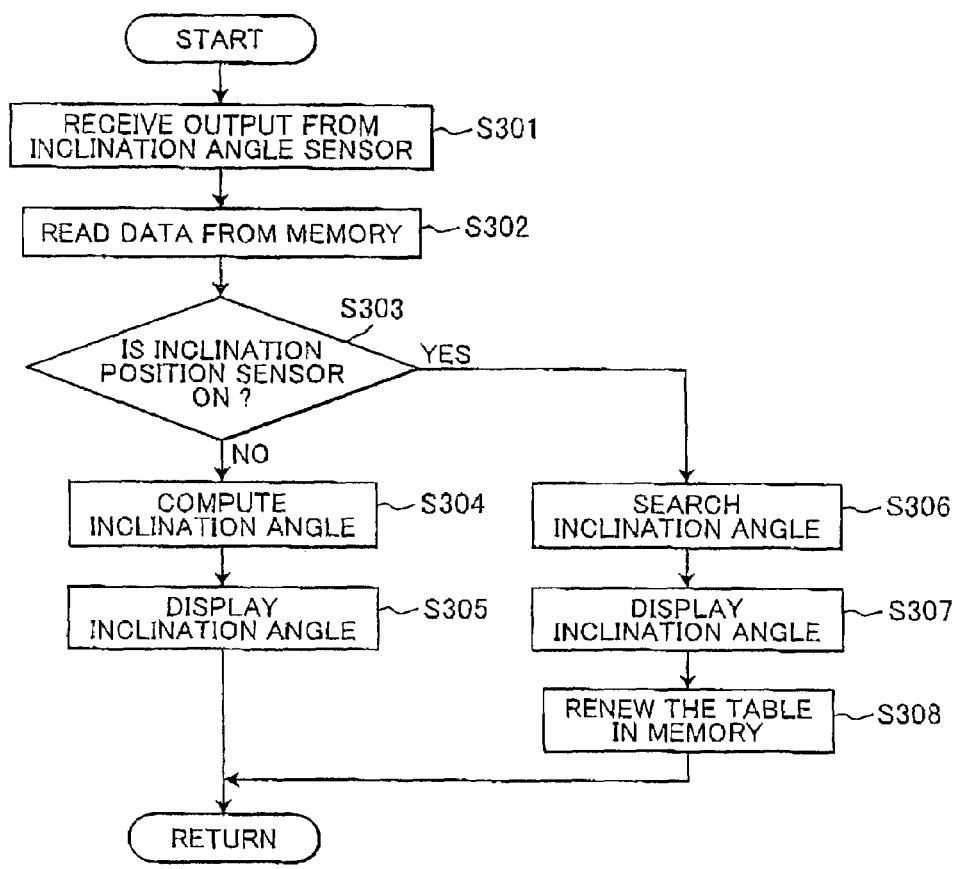

Next, the inclination angle display procedure will be described in detail referring to FIG. 9. In this procedure, the microcomputer 160 calculates and displays the inclination angle of the miter saw 10. The microcomputer 160 receives voltage data from the inclination angle sensor 180 (S301).

Next, the microcomputer 160 reads inclination angle data from the memory 170 corresponding to the positions at which the limit switches LS2 and LS3 are on when the tilting guide 42 and bolt 25 are engaged (3302). Output from the inclination position sensor 140 indicating whether the limit switches LS2 and LS3 are on is inputted via the input port 166a. The microcomputer 160 determines whether the tilting guide 42 is engaged with the bolt 25 and either the limit switch LS2 or limit switch LS3 is on (S303).

When neither the limit switch LS2 nor limit switch LS3 is on in 8216, the microcomputer 160 determines that the tilting guide 42 and bolt 25 are not engaged. The microcomputer 160 uses the table of corresponding voltages and inclination angles stored in the memory 170 and the voltages outputted from the inclination angle sensor 180 to calculate the inclination angle of the supporting unit (S304) and displays this inclination angle on the display 70 (S305). The microprocessor 160 then advances to S112.

In S304, the microcomputer 160 compares a plurality of voltage data stored in the memory 170 to the output voltage from the inclination angle sensor 180 to select two values from the plurality of voltages stored in the memory 110, including one slightly larger than and the closest to the output voltage and the other slightly smaller than and the closest to the output voltage. Using a linear approximation between the angles corresponding to the two selected voltages, the microcomputer 160 calculates the inclination angle equivalent to the voltage output from the inclination angle sensor 180 (S304) and displays the Calculated inclination angle as the inclination angle of the supporting unit 40 (S305).

When either the limit switch LS2 or the limit switch LS3 is on in S303, the microcomputer 160 determines that the tilting guide 42 and bolt 25 are engaged. The microcomputer 160 references the memory 170 to find the inclination angle corresponding to the voltage outputted from the inclination angle sensor 180 (S306) and displays this inclination angle on the display 70 (S307).

To calculate the inclination angle in this case, the microcomputer 160 compares various voltage data stored in the memory 170 to the voltage outputted from the inclination angle sensor 180. The microcomputer 160 selects an inclination angle exhibiting the nearest voltage to the voltage outputted from the inclination angle sensor 180 from the data stored in the memory 170 (S306) and displays this inclination angle (S307).

After completing S307, the microcomputer 160 sends the inclination angle corresponding to output from the inclination angle sensor 180 to the memory 170 via the output port 168a to renew the table in the memory 170 (S308) The microcomputer 160 then advances to S112 Next, the microcomputer 160 checks output from the display reset unit 150 via the input port 166a to determine whether the limit switch LS5 for resetting the displayed rotation angle is on (S112). The microcomputer 160 jumps to S116 if the limit switch LS5 is not on. However, if the limit switch LS5 is on, the microcomputer 160 resets the displayed rotation angle to 0° via the output port 166c (S113) and switches the reference position to another reference position corresponding to the displayed rotation angle (S114). The microcomputer 160 calculates a new predetermined angle corresponding to the recess 26a based on the rotation angle at the point of reset and stores this new angle in the memory 170 (S115).

Next, the microcomputer 160 determines whether the limit switch LS4 for resetting the displayed inclination angle has been turned on (S116). The microcomputer 160 jumps to S120 if the limit switch LS4 is not on. However, it the limit switch LS4 is on, the microcomputer 160 resets the displayed inclination angle to zero (S117) and switches the vertical reference position to another reference position corresponding to the angle displayed on the display 70 when the limit switch LS4 is on (S118). The microcomputer 160 calculates a new inclination angle corresponding to the position at which the tilting guide 42 and bolt 25 engage based on the inclination angle at the point of reset and stores this new value in the memory 170 (S119).

In S115 and S119, the memory 170 is allocated a different area from the initial area for storing data which is sent from the microcomputer 160, after the display reset unit 150 is activated by pressing the limit switches LS4 or LS5. Accordingly, the memory 170 can store two different kinds of table including the correspondence between the predetermined position and the voltage data of the rotation and inclination angle sensors 180 and 190, after at least one of the limit switches LS4 and LS5 is turned on.

The memory 170 can continue storing the two tables, the initial one and the new table made by resetting the display 70, after the power supply to the microcomputer 160 is turned off Therefore, this adds a new convenience in which the microcomputer 160 can utilize the two tables depending on the user's preference after the power is turned off and turned back on again. It is also possible to provide another switch for recovering the initial table for the calculation of angle without deleting the new table stored in the memory 170, when the power is turned off and turned back on after the display reset unit 150 is activated. With this configuration, the present invention can provide an angle displaying device suited to the customer's needs.

After completing the display reset process, the computer 160 determines whether the signal output from the rotation angle sensor 190 remains the same for at least a predetermined time period (S120). If any changes occur during the predetermined time period, the microcomputer 160 returns to S106.

However, if the signal outputted from the rotation angle sensor 190 remains the same for the predetermined time period in S120, then the microcomputer 160 determines whether the signal outputted from the inclination angle sensor 180 remains the same for a predetermined time period (S121). If the signal changes during this time period, then the microcomputer 160 returns to S106.

However, if there are no changes over the predetermined time period in S121, then in S109 the microcomputer 160 outputs a signal for turning off the display 70 via the output port 166c. At the same time, the microcomputer 160 outputs a signal for halting power supply to the microcomputer 160 via the output port 166b.

In this way, the microcomputer 160 jumps to S109 if there are no changes during the predetermined time periods, outputs a signal via the output port 166c for turning off the display 70, and outputs a signal via the output port 166b for halting power supply to the microcomputer 160. With this construction, the miter saw 10 can reduce energy consumption of the battery 110, which is the power source for the angle displaying device 70.

While the miter saw 10 in this embodiment described above has an inclination function for the supporting unit 40 and a rotation function for the turntable 22, the miter saw 10 may also be provided with only one of these functions.

The angle sensor in this embodiment is configured of the potentiometers 50 and 60, but is not limited to such devices. For example, a rotary encoder for counting the angle of rotation may be used as the angle sensor. Next, a process for detecting the rotation angle of the turntable 22 using a rotary encoder will be described.

When using a rotary encoder to detect rotations of the turntable 22, twenty pulses are generated during each 1° that the turntable 22 rotates for two types of pulses A and B that are 90° out of phase from each other. These pulses are used to detect the rotation angle of the turntable 22. Using the two types of pulses A and B that are 90° out of phase, it is possible to detect whether the turntable 22 is rotating clockwise or counterclockwise.

Figure 10:
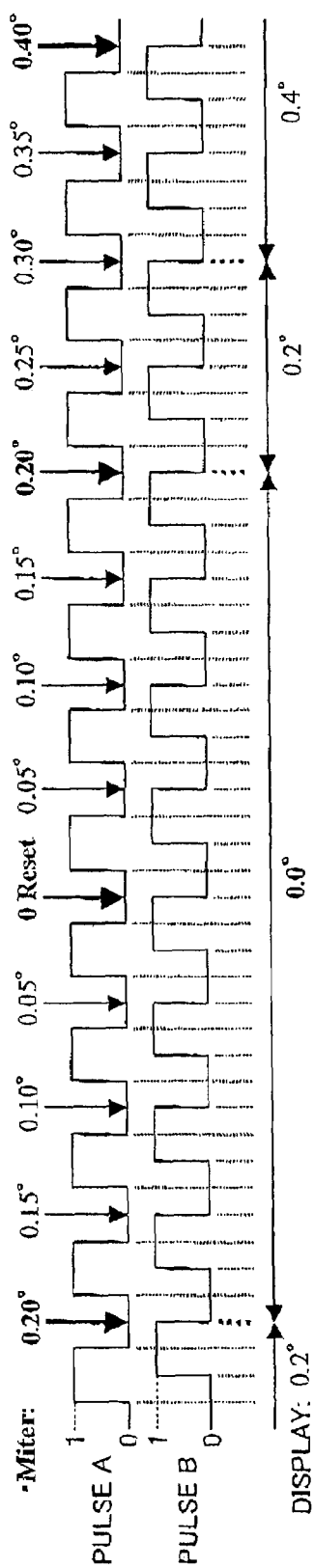
FIGS. 10 through 15 are diagrams showing output pulses generated by a rotary encoder used in the miter saw in Fig.

The following is a specific example shown in FIG. 10, where "1" indicates a high pulse and "0" a low pulse. If pulse A is 0 and pulse B is 0 and subsequently pulse A becomes 1 while pulse B remains 0, then it can be determined that the turntable 22 is rotating to the right in FIG. 10, that is, clockwise. However, if pulses A and B are 0 and subsequently pulse B becomes 1 while pulse A remains 0, then it can be determined that the turntable 22 is rotating to the left in FIG. 10, that is, counterclockwise.

Further, twenty pulses are generated for each type A and B while the turntable 22 rotates 1°. Hence, one pulse for each type A and B is generated each time the turntable 22 rotates 0.05°, as shown in FIG. 10. If for example the turntable 22 rotates from a position of 0° to a position of 45°, 900 pulses are generated for each type A and B.

The microcomputer 160 displays the rotation angle of the turntable 22 in units of 0.2°. In other words, the rotation angle of the turntable 22 displayed on the display 70 is updated to a value larger or smaller by 0.2° each time the turntable 22 rotates 0.2° clockwise or counterclockwise.

At this time, we will assume that 0° is displayed on the display 70 and that the rotation angle of the turntable 22 is also exactly 0°. As the turntable 22 rotates to the right in FIG. 10, the rotation angle displayed on the display 70 remains at 0° even when the microcomputer 160 detects the pulse indicating that the turntable 22 has rotated to the 0.05° position. As the turntable 22 continues to rotate and the microcomputer 160 detects a pulse indicating that the turntable 22 has rotated to the 0.20° position, the microcomputer 160 adds 0.2° to the value displayed on the display 70 and updates the display to 0.2°. As the turntable 22 continues to rotate and the microcomputer 160 detects a pulse indicating that the turntable 22 has rotated to the 0.30° position, the microcomputer 160 adds 0.2° to the display on the display 70 and updates the display to 0.4°.

In contrast, let us assume that 0.4° is displayed on the display 70 and that the turntable 22 is rotating in the counterclockwise direction from a rotation angle of exactly 0.4°. Here, the rotation angle displayed on the display 70 remains at 0.4° even when the microcomputer 160 detects a pulse indicating that the turntable 22 has rotated to the 0.35° position, As the turntable 22 continues to rotate counterclockwise and the microcomputer 160 detects a pulse indicating that the turntable 22 has rotated to 0.30°, the microcomputer 160 subtracts 0.2° from the value displayed on the display 70 and updates the display 70 to 0.2°. As the turntable 22 continues to rotate and the microcomputer 160 detects a pulse indicating that the turntable 22 has rotated to 0.20°, the microcomputer 160 again subtracts 0.2° from the value displayed on the display 70 and updates the display 70 to 0°.

Figure 11:
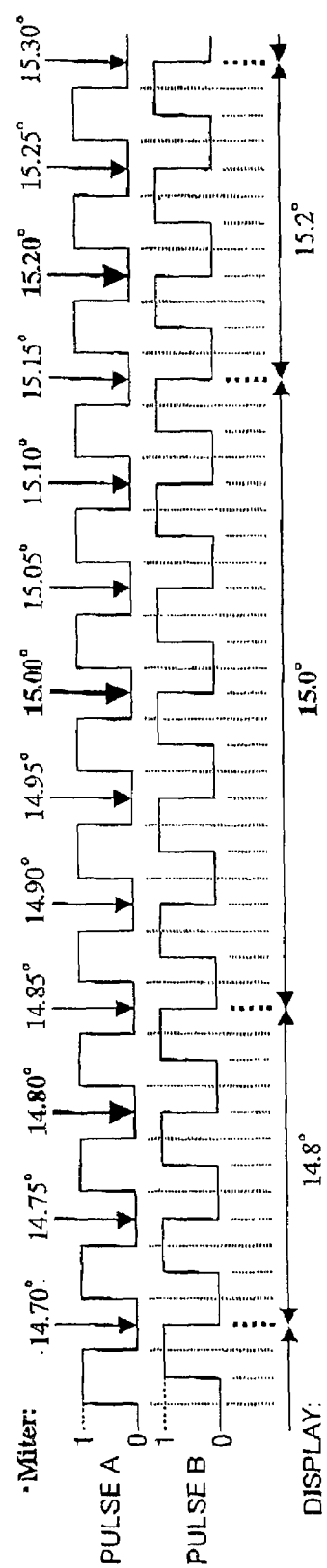

Next, let us assume that 14.8° is displayed on the display 70 and that the rotation angle of the turntable 22 is exactly 14.8°. The turntable 22 is rotating clockwise, that is, to the right in FIG. 11. When the microcomputer 160 detects a pulse indicating that the turntable 22 has rotated to the 14.85° position, the microcomputer 160 displays a special rotation angle of 15.0° on the display 70.

As the turntable 22 continues to rotate from this state and the microcomputer 160 detects a pulse indicating that the turntable 22 has rotated to 15.15°, the microcomputer 160 displays 15.2° on the display 70.

In contrast, let us assume that 15.2° is displayed on the display 70 and that the rotation angle of the turntable 22 is exactly 15.2°. Here, the turntable 22 is rotating counterclockwise, that is, toward the left in FIG. 11. When the microcomputer 160 detects a pulse indicating that the turntable 22 has rotated to the 15.15° position, the microcomputer 160 displays the special rotation angle of 15.0° on the display 70.

As the turntable 22 continues to rotate from this position and the microcomputer 160 detects a pulse indicating that the turntable 22 has rotated to 14.85°, the microcomputer 160 displays 14.8° on the display 70.

Now let us assume that 22.4° is displayed on the display 70, but the rotation angle of the turntable 22 is 22.35°. The turntable 22 is rotating clockwise, that is, toward the right in FIG. 12. When the microcomputer 160 detects a pulse indicating that the turntable 22 has rotated to the 22.40° position, the microcomputer 160 displays a special rotation angle of 22.5° on the display 70.

As the turntable 22 continues to rotate from this position and the microcomputer 160 detects a pulse indicating that the turntable 22 has rotated to 22.60°, the microcomputer 160 displays 22.6° on the display 70.

Figure 12:
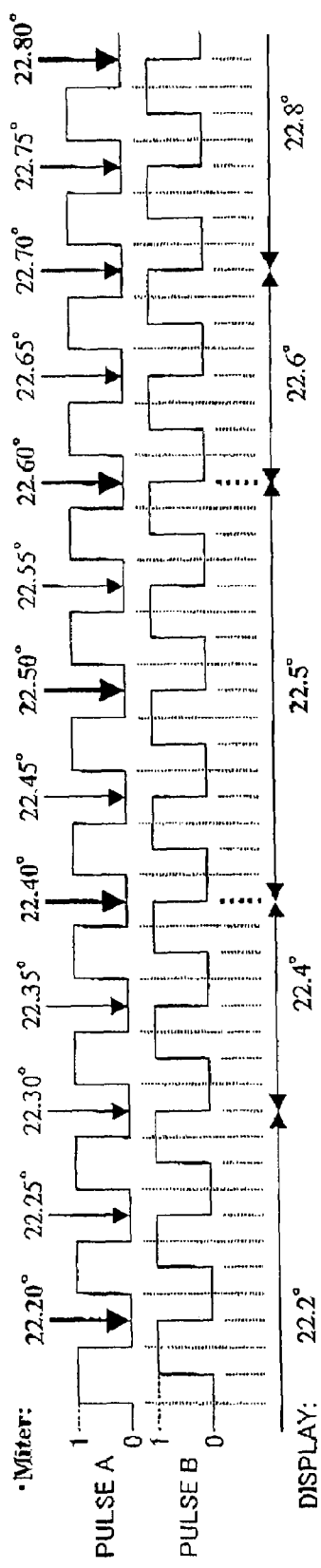

In contrast, let us assume that 22.6° is displayed on the display 70 and the rotation angle of the turntable 22 is 22.65°, while the turntable 22 rotates counterclockwise, that is, toward the left in FIG. 12. When the microcomputer 160 detects a pulse indicating that the turntable 22 has rotated to the 22.60°, the microcomputer 160 displays the special rotation angle of 22.5° on the display 70.

As the turntable 22 continues to rotate from this position and the microcomputer 160 detects a pulse indicating that the turntable 22 has rotated to 22.40°, the microcomputer 160 displays 22.4° on the display 70.

Figure 13:
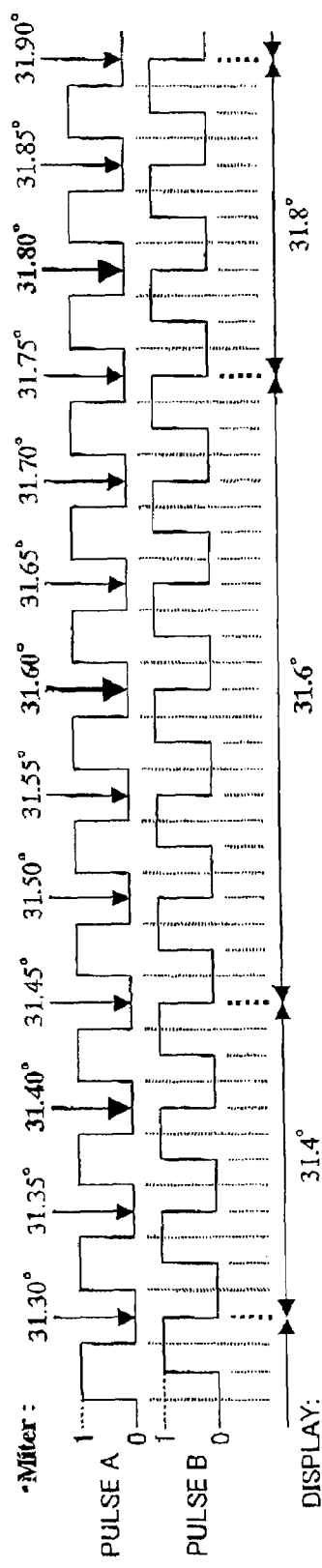

Next, we will assume that 31.4° is displayed on the display 70 and the rotation angle of the turntable 22 is at 31.40°, where the turntable 22 rotates clockwise, that is, toward the right in FIG. 13. When the microcomputer 160 detects a pulse that indicates the turntable 22 has rotated to the 31.45° position, the microcomputer 160 displays a special rotation angle of 31.6° on the display 70.

As the turntable 22 continues to rotate from this position and the microcomputer 160 detects a pulse indicating that the turntable 22 has rotated to 31.75°, the microcomputer 160 displays 31.8° on the display 70.

In contrast, let us assume that 31.8° is displayed on the display 70 and the rotation angle of the turntable 22 is 31.80°, while the turntable 22 rotates counterclockwise, that is, toward the left in FIG. 13. When the microcomputer 160 detects a pulse indicating that the turntable 22 has rotated to the 31.75° position, the microcomputer 160 displays the special rotation angle of 31.6° on the display 70.

As the turntable 22 continues to rotate and the microcomputer 160 detects a pulse indicating that the turntable 22 has rotated to 31.45°, the microcomputer 160 displays 31.4° on the display 70.

Figure 14:
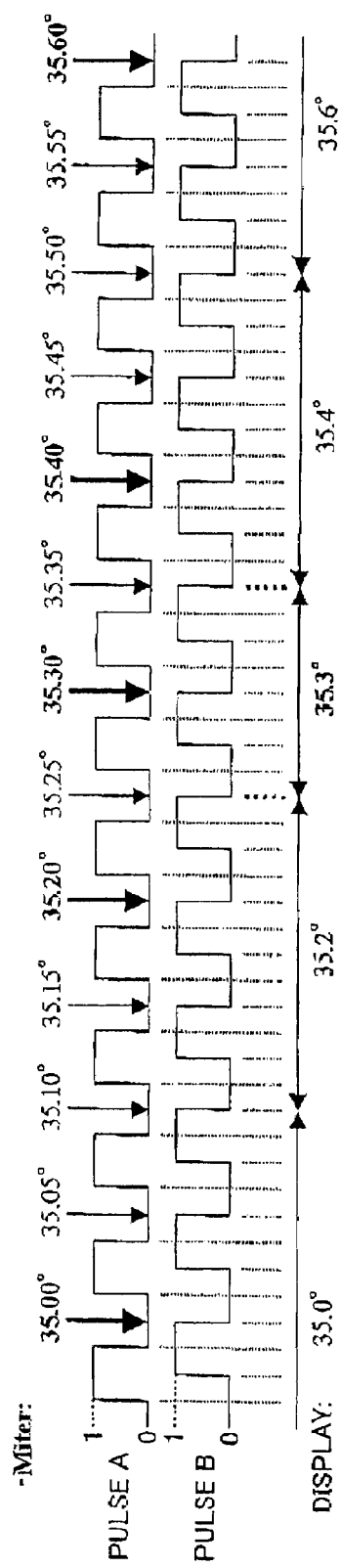

Next, let us assume that 35.2° is displayed on the display 70 and the rotation angle of the turntable 22 is exactly 35.20°, as shown in FIG. 14. Here, the turntable 22 rotates clockwise, that is, toward the right in FIG. 14. When the microcomputer 160 detects a pulse indicating that the turntable 22 has rotated to the 35.25° position, the microcomputer 160 displays the special rotation angle of 35.3° on the display 70.

As the turntable 22 continues to rotate and the microcomputer 160 detects a pulse indicating that the turntable 22 has rotated to 35.35°, the microcomputer 160 displays 35.4° on the display 70.

In contrast, let us assume that 35.4° is displayed on the display 70 and that the rotation angle of the turntable 22 is exactly 35.40°. Here, the turntable 22 rotates counterclockwise, that is, toward the left in FIG. 14. When the microcomputer 160 detects a pulse indicating that the turntable 22 has rotated to the 35.35° position, the microcomputer 160 displays the special rotation angle of 35.3° on the display 70.

As the turntable 22 continues to rotate and the microcomputer 160 detects a pulse indicating that the turntable 22 has rotated to 35.25°, the microcomputer 160 displays 35.2° on the display 70.

Figure 15:
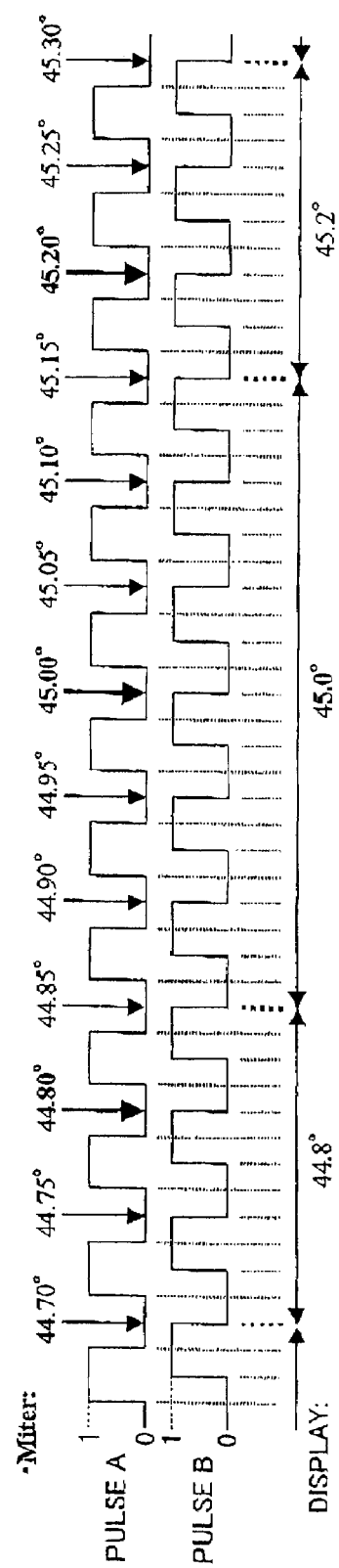

Next, let us assume that 44.8° is displayed on the display 70 and that the rotation angle of the turntable 22 is 44.80°. Here, the turntable 22 rotates clockwise, that is, toward the right in FIG. 15. When the microcomputer 160 detects a pulse indicating that the turntable 22 has rotated to the 44.85° position, the microcomputer 160 displays a special rotation angle of 45.0° on the display 70.

As the turntable 22 continues to rotate and the microcomputer 160 detects a pulse indicating that the turntable 22 has rotated to 45.15°, the microcomputer 160 displays 45.2° on the display 70.

In contrast, let us assume that 45.2° is displayed on the display 70 and that the rotation angle of the turntable 22 is 45.20°. Here, the turntable 22 rotates counterclockwise, that is, toward the left in FIG. 15. When the microcomputer 160 detects a pulse indicating that the turntable 22 has rotated to the 45.15° position, the microcomputer 160 displays the special rotation angle of 45.0° on the display 70.

As the turntable 22 continues to rotate and the microcomputer 160 detects a pulse indicating that the turntable 22 has rotated to 44.85°, the microcomputer 160 displays 44.8° on the display 70.

With this method, when the pulse detected by the rotation angle sensor falls within the range of special rotation angles such as the proximity areas centering 0, 15, 22.5, 31.6, or 45, the microcomputer 160 can display the special rotation angle on the display 70. Accordingly, the user can recognize when the turntable 22 has rotated to the predetermined rotation angle such as 0, 15, 22.5, 31.6, and 45. The inclination angle of the supporting unit 40 can similarly be detected using a rotary encoder.

While in the embodiment described above the inclination function of the supporting unit 40 is capable of inclining only in one direction, the inclination function may be configured to incline both left and right using the right angle position as the reference point.

In the embodiment described above, the tilting guide 42 and bolt 25 are configured to engage when the supporting unit 40 is in the right angle position or in the maximum inclination position. However, these engaging units may also be configured to engage at another position between the right angle position and the maximum inclination position. In such a case, it is preferable to provide a function for outputting a signal when the engaging units are engaged.

In the embodiment described above, the miter saw 10 is provided with the turntable 22 that is capable of rotating over the base 21, and the supporting unit 40 is coupled with the base 21 via the turntable 22. However, the miter saw 10 may be configured without the turntable 22, so that the supporting unit 40 couples directly with the base 21.

In the embodiment described above, the holder 32 is pivotably supported on the supporting unit 40. However, the supporting unit 40 may be configured in a divided construction, wherein the portion supporting the pivoting axis 41 and holder 32 can slide over the portion coupled with the turntable 22 or the base 21 while remaining substantially parallel to the side surfaces of the cutter blade 31.

The miter saw 10 described above exhibits the following advantages.

The miter saw 10 can display an angle without confusing a user.

The miter saw 10 can cut the workpiece in an inclined direction with respect to the side face of the workpiece.

The angle at which the supporting unit 40 or base 21 and the turntable 22 are engaged mechanically is displayed not based on a signal from the angle sensors 180 and 190, but based on data in the table stored in the memory 170 for the predetermined angle. Accordingly, the angle displayed on the display matches with the angle indicated for each recess 26a. Hence, the user is not provided with multiple data values that may cause confusion and lead to a decline in operability.

When the supporting unit or base and the turntable are engaged mechanically at a predetermined angle, it is possible to correct the angle detected by the angle sensors and displayed on the display each time the supporting unit or base and the turntable are engaged mechanically at a predetermined angle. Hence, even when the angle detected by the angle sensors deviates from the angle determined through the mechanical engagement at a predetermined position, deviation in the displayed angle caused by detection errors can be suppressed.

Positions are determined by engaging the tilting guide of the supporting unit with the bolt provided on the base or turntable when the side surfaces of the circular saw blade in relation to the top surface of the base are at a right angle (the most frequently used position) or at the maximum inclination (45°). Further, by providing the miter saw with an inclination angle sensor for outputting a signal to the controller when the side surfaces of the circular blade are at a right angle or at the maximum inclination angle with respect to the top surface of the base, it is possible to resolve discrepancies between the displayed angle and the angle determined by positioning for the most frequently used cutting positions.

When the angle position set for engaging the tilting guide of the supporting unit with the head of a bolt differs from the angle detected by the inclination angle sensor when the engaging unit is engaged with the bolt head, it is possible to adjust the set angle position according to the detected angle. Hence, when a deviation is found with the set angle position, it is possible to adjust this position The miter saw is configured to reset a displayed angle to zero at a desired position, in subsequent angle displaying operations, to display the inclination angle and rotation angle from the new reference position provided by resetting the displayed angle. With this construction, the user can set a desired position to 0°, the reference position, thereby improving operability.

By resetting the displayed angle to zero, the memory can store the new table including the relationship between the recesses and the output from the sensors. Accordingly, the user can select one of the two tables showing the relationship from the memory after resetting the display to zero. Hence, the reference angle can easily be restored to the initial 0°, thereby improving operability.

By providing the constant voltage power supply, it is possible to suppress a decline in detection accuracy.

The display is positioned on the front surface of the turntable so that the user can look at the display easily during operations.

If the displayed angle has not changed for more than the predetermined time period, the power supply is suspended. Accordingly, it is possible to reduce power consumption, which is particularly effective when the power source is a battery.

When using a battery for the power source, the display can be installed at nearly any location without restriction. Using the power source for the cutting unit requires complex wiring, while a battery enables the display to be installed easily on the base or turntable, which improves readability of the displaying means.

Displaying a demo unrelated to the angle display, such as the product's model name or a greeting, for a predetermined time after the power is first turned on can increase the user's feeling of affection toward the product.

Configuring the turntable and base to engage at the 0° position, which is most frequently used, can improve operability.

Providing a plurality of grooves at predetermined angular positions most frequently used can improve productivity. Further, it is possible to display angles without variations when detecting that the lever and groove are engaged, thereby preventing a decline in productivity.

It is not necessary that the recesses 26a be formed at fixed intervals.

Next, the following description will be made for explaining another embodiment of the miter saw 10. In this embodiment, only the miter saw 10 has the different structure from that of the first embodiment described above. Accordingly, the explanation for the display 70 and the controller 100 will be omitted.

Figure 16:
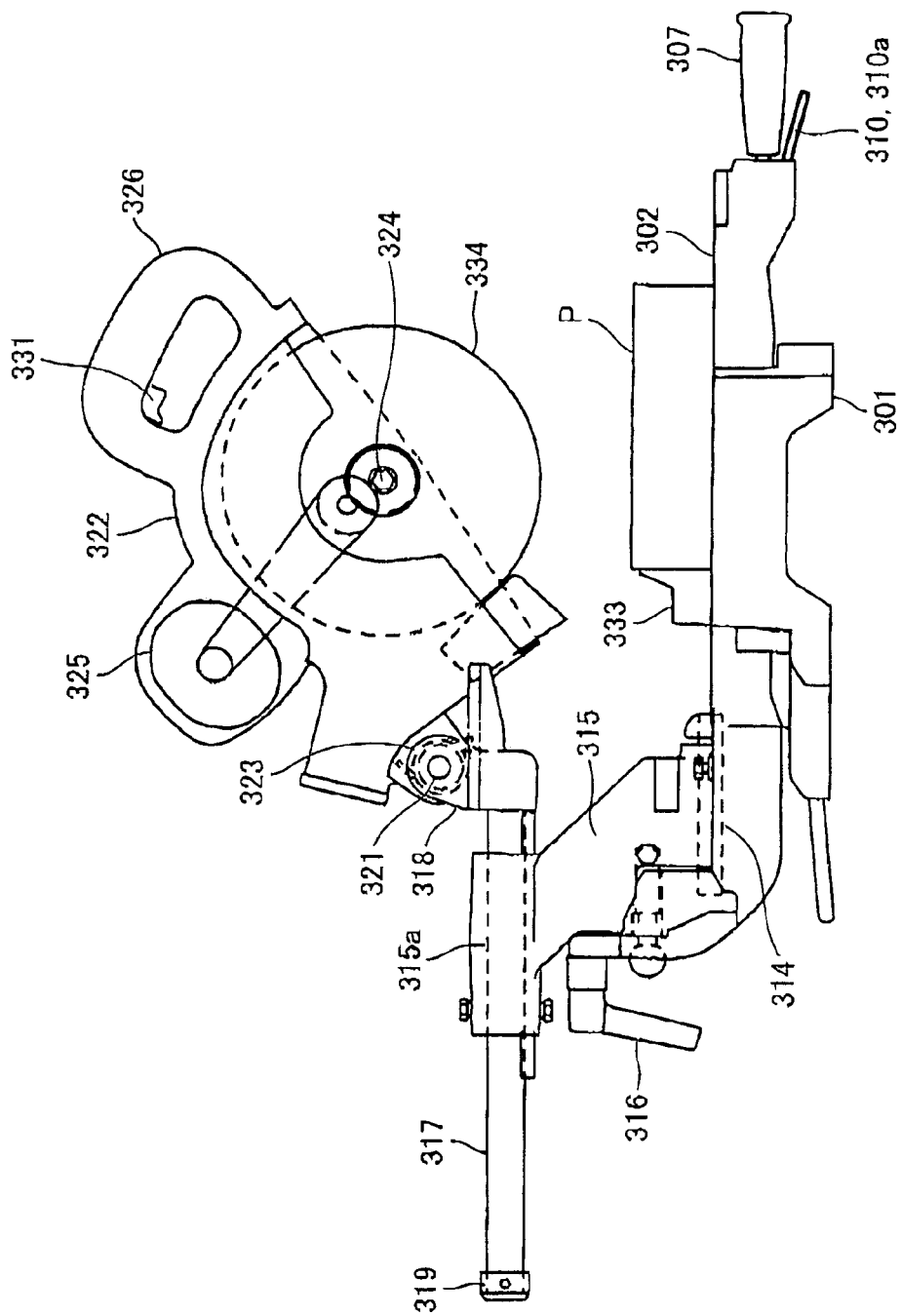
FIG. 16 is a side view showing a miter saw according to a second embodiment of the present invention.

As shown in FIG. 16, the miter saw 10 includes a base 301, and a turntable 302 embedded in the center of the base 301 so that the top surface of the turntable 302 is flush with the top surface of the base 301, as shown in FIG. 16, and capable of rotating within a horizontal plane. A workpiece P formed of wood is placed on the top surfaces of the base 301 and turntable 302.

Figure 17:
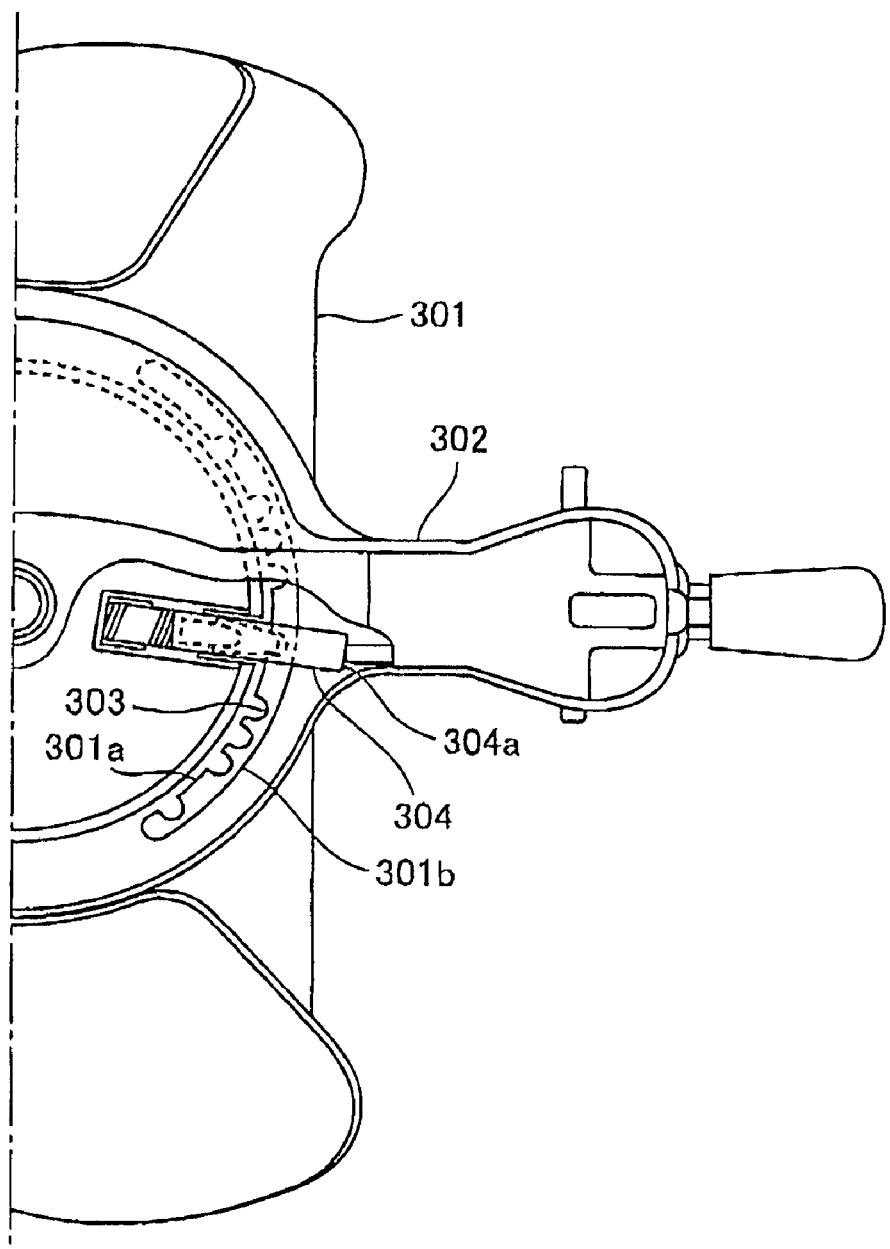
FIG. 17 is a bottom view of the miter saw in FIG. 16.
Figure 18:
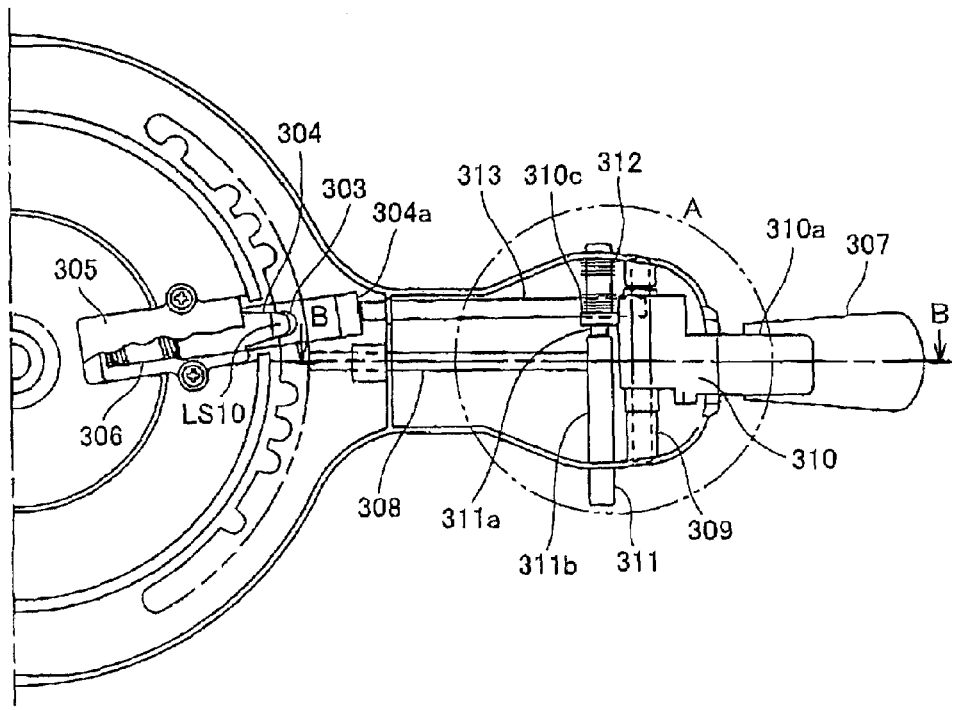
FIG. 18 is a partial enlarged bottom view of the miter saw in FIG. 16.
Figure 19:
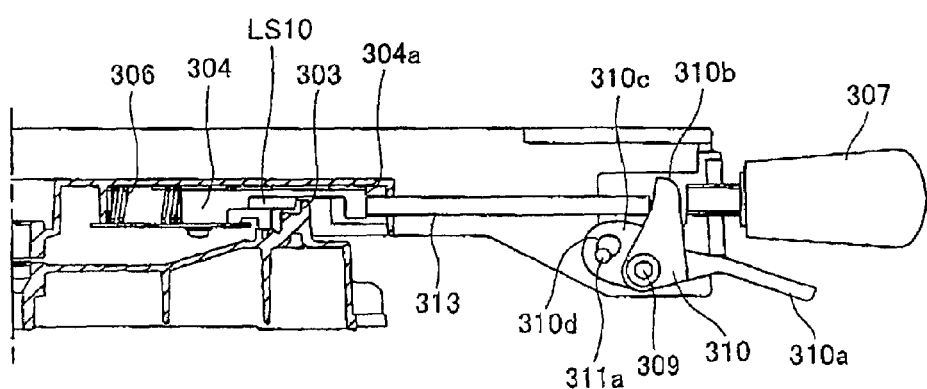
FIG. 19 is a side view of the miter saw in Fig, 16 in which the turntable is engaged with the base.

As shown in FIG. 17, the base 301 includes side walls 301a and 301b. A plurality of recesses 303 having arc shapes are formed in the inner side of the side wall 301a. A stopper 304 is received in one of the recesses 503. The stopper 304 is supported on a cover 305, as shown in FIG. 18. The stopper 304 has a limit switch LS 10 provided on the tip thereof. The limit switch LS 10 is connected to the controller 100 (not shown). A stopper spring 306 urges the stopper 304 in a direction outward from the rotational center of the turntable 302 so that the stopper 304 is fitted into one of the recesses 303. As shown in FIGS. 18 and 19, a handle 307 is twistingly fitted into the protruding end of the turntable 302 and is capable of pushing against the side wall 301b of the base 301 via a shaft 308 positioned at the end of the handle 307. Rotation of the turntable 302 with respect to the base 301 is restricted by tightening the handle 307 to press the shaft 308 against the side wall 301b.

An operating member 310 is rotatably supported on the turntable 302 near the handle 307 by a lever shaft 309 that extends orthogonally to the axis of the handle 307. The operating member 310 includes a lever part 310a that extends beneath the handle 307. The user operates the lever part 310a using the same hand that grips the handle 307.

A protruding part 310c is formed on the operating member 310 substantially symmetrically opposite the lever part 310a with respect to the lever shaft 309. An elongated hole 310d is formed through the protruding part 310c and is configured of a hole having a small diameter and a hole having a large diameter that are juxtaposed and in fluid communication. A pin 311 inserted in the hole 310d is maintained in the turntable 302 so as to be able to slide in the direction of its axis. The pin 311 includes a small diameter part 311a and a large diameter part 311b. A spring 312 urges the pin 311 so that the small diameter part 311a is positioned in the protruding part 310c of the operating member 310 and supported therein, while at least an end portion of the large diameter part 311b protrudes outside the turntable 302.

A shaft 313 is also supported in the turntable 302 so as to be able to slide along its axis. One end of the shaft 313 is capable of contacting a protruding part 310b of the operating member 310, while the other end contacts a protruding part 304a of the stopper 304. When the operating member 310 is rotated, the stopper 304 is moved forward and backward via the shaft 313.

A fence 333 is fixed to the top surface of the base 301 for supporting the side surface of the workpiece P as shown in FIG. 16. A blade receiving plate (not shown) having a groove for inserting a saw blade 334 is fixed to the top center of the turntable 302. When cutting the workpiece P, the saw blade 334 is inserted into the groove formed in this blade receiving plate so that the bottom edge of the saw blade 334 is lowered farther than the top surface of the turntable 302. Thus, the blade receiving plate functions to prevent the saw blade 334 from producing a rough edge on the finished bottom surface of the workpiece P. A holder 315 is erected on the back edge of the turntable 302 via a holder shaft 314. By positioning the axial center of the holder shaft 314 substantially flush with the top surface of the turntable 302, the holder 315 can incline left and right about the top surface of the turntable 302 using the holder shaft 314 as a pivot point.

Figure 20:
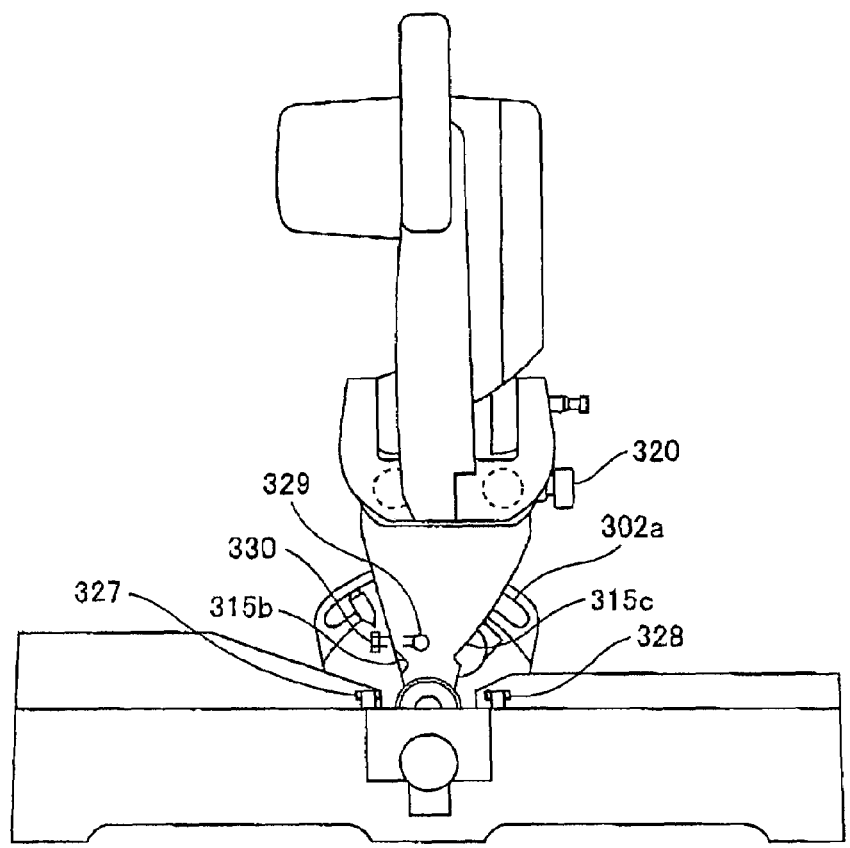
FIG. 20 is an enlarged view of the miter saw in FIG. 16.

As shown in FIG. 20, an elongated slot 302a is formed in the rear portion of the turntable 302 and centered over the holder shaft 314. A clamp lever 316 penetrates the slot 302a, while a screw part (not shown) formed on the end of the clamp lever 316 is screwed into a threaded hole formed in the back surface of the holder 315. When the clamp lever 316 is loosened, the holder 315 can incline about the holder shaft 314 within the range of the slot 302a. When the clamp lever 316 is tightened the turntable 302 is tightened between the clamp lever 316 and the holder 315 and the holder 315 is thus fixed at the desired position. The slot 302a is formed with a range sufficient to allow the holder 315 to incline about 45° both left and right.

When the holder 315 is erected at a right angle to the turntable 302, through-holes 315a formed at two locations through the top of the holder 315 run parallel to the top surface of the turntable 302. Sliding member holding members (not shown) are provided in these through-holes 315a, and two guide bars 317 extending parallel to each other in the left-to-right direction are inserted through the through-holes 315a. The guide bars 317 are capable of sliding parallel to the top surface of the turntable 302 in the front-to-back direction via the sliding member holding members. A circular saw holder 318 is provided on the front end of the guide bars 317, while a support 319 that prevents the guide bars 317 from coming out of the through-holes 315a is provided on the back end of the guide bars 317. A knob 320 disposed on the side surface of the holder 315 restricts sliding of the guide bars 317.

A circular saw section 322 is pivotably supported on the top of the circular saw holder 318 via a shaft 321 and is capable of pivoting up and down over the top surface of the base 301. A spring 323 is disposed between the circular saw holder 318 and the circular saw section 322 for urging the circular saw section 322 upward.

The circular saw section 322 rotatably supports a blade shaft 324 for fixing the saw blade 334. The circular saw section 322 is also configured of a motor unit 325 for generating a motive force that is coupled to the top of the blade shaft 324, and a handle 326.

Stoppers 315b and 315c are provided on the front surface of the holder 315 for fixing the inclination position of the holder 315. Stopper bolts 327 and 328 are screwed vertically into the top surface on the back of the turntable 302 at positions along the paths of the stoppers 315b and 315c. When the holder 315 is inclined, the stopper 315b or stopper 315c engages with the head of the respective stopper bolt 327 or stopper bolt 328 at a predetermined inclination angle for setting the inclination position of the circular saw section 322. The stopper bolt 327 is positioned to engage with the stopper 315b when the holder 315 is inclined to the left at 45°. The stopper bolt 328 is positioned to engage with the stopper 315c when the holder 315 is inclined to the right at 45°. A pin 329 is supported in the turntable 302 for fixing the position of the holder 315 at a right angle to the turntable 302 and is capable of moving horizontally in the front-to-back direction. When the holder 315 is positioned as shown in FIG. 20, a stopper bolt 330 screws horizontally into the holder 315 at a position along the path of the pin 329. When the holder 315 is positioned for a right angle cut, the end of the stopper bolt 330 is in contact with the peripheral portion of the pin 329.

Next, the operations of the stopper devices used in the miter,saw of the present invention will be described with reference to FIGS. 17 and 18.

As shown in FIGS. 17 and 18, the stopper 304 is in a state of contact with the inner side of the side wall 1a by the urging force of the stopper spring 306. When the turntable 302 is rotated, the stopper 304 becomes fitted into one of the recesses 303, as shown in FIG. 17, preventing the turntable 302 from rotating farther. In addition, when the stopper 304 is engaged in one of the recesses 303, the limit switch LS10 on the tip of the stopper 304 is turned on so that the controller 100 can determine that the stopper 304 is engaged in the recess 303. To rotate the turntable 302 farther, the user must pull the lever part 310a upward. Through this operation, the operating member 310 rotates, causing the protruding part 310b to push the shaft 313 toward the rotational center of the turntable 302. The shaft 313 pushes against the protruding part 304a of the stopper 304 and the stopper 304 overcomes the urging force of the stopper spring 306 to be pushed out of the recess 303, thereby releasing the restriction for rotating the turntable 302. The turntable 302 can be rotated while this state is maintained.

In order to again restrict rotation of the turntable 302, the user releases the grip on the operating member 310, allowing the stopper spring 306 to urge the stopper 304 back into one of the recesses 303, thereby restricting rotation of the turntable 302. Accordingly, it is necessary to pull up on the operating member 310 in order to rotate the turntable 302.

Figure 21:
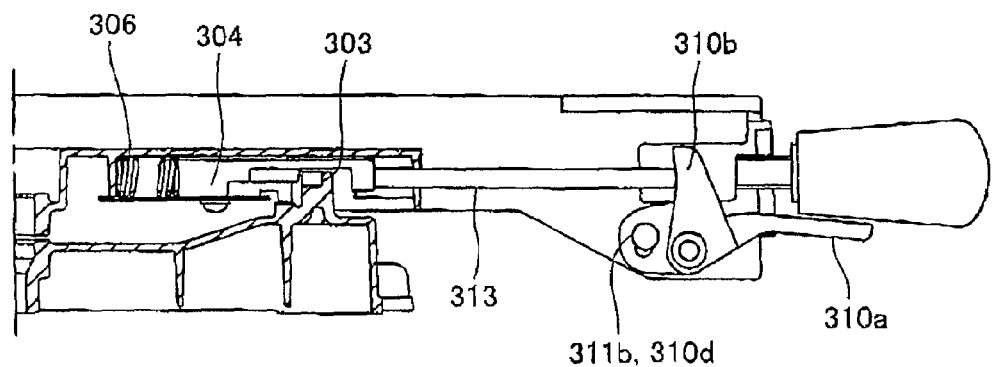
FIG. 21 is a side view of the miter saw in FIG. 16 in which the turntable is movable with respect to the base.

Next, operations to enable free rotation of the turntable 302 will be described. As shown in FIG. 21, the user lifts up on the lever part 310a and moves the pin 311 against the urging force of the spring 312 to insert the large diameter part 311b into the large diameter part of the hole 310d. By releasing the operating member 310 in this state, the urging force of the stopper spring 306 causes the large diameter part 311b of the pin 311 to contact the inner walls of the hole 310d. The frictional force of this contact restrains movement of the pin 311 so that the operating member 310 is engaged in its upwardly raised state (the position of the pin 311 being the engaging position) Since the stopper 304 is not inserted into the recesses 303 in this state, the stopper devices of the turntable 302 can be maintained in a released state, that is, an unlocked state.

By increasing the frictional force between the outer surface of the large diameter part 311b and the inner surface of the hole 310d through a process for roughening one of the surfaces, this unlocked state can be more reliably maintained, thereby reducing the chance of the unlocked state being released suddenly.

To fix the turntable 302 in a desired position of rotation, the handle 307 may be tightened to urge the side wall 301b via the shaft 308.

In order to once again engage the stopper device used to restrict rotations of the turntable 302, that is, to release the unlocked state, the operating member 310 is temporarily pulled upward to create play between the pin 311 and the large diameter hole in the hole 310d, enabling the pin 311 to be moved by the urging force of the spring 312 so that the small diameter part 311a becomes positioned in the hole 310d formed in the protruding part 310c. Now, the operating member 310 can again rotate and the stopper device functions according to the normal operations described above (the pin 311 is positioned in the non-engaging position).

While the invention has been described in detail with reference to specific embodiments thereof, it would be apparent to those skilled in the art that many modifications and variations may be made therein without departing from the spirit of the invention, the scope of which is defined by the attached claims.

What is claimed is:

1. A miter saw comprising:
   a base for mounting a workpiece thereon;
   a movable member supported to the base and movable relative to the base;
   a cutter blade portion connected to the movable member for rotatably supporting a circular saw blade to cut the workpiece;

a positioning portion associated with the movable member and providing a predetermined nominal position of the movable member with respect to the base, the predetermined nominal position including a reference position and a specific position;

a detector for producing an output signal indicative of a position of the movable member with respect to the base;

a display for displaying a moving amount of the movable member from the reference position; and a processor for setting an angle between the reference position and the predetermined nominal position as the moving amount when the movable member is positioned at the predetermined nominal position, the processor computing the moving amount based on the output signal from the detector when the movable member is positioned at a position other than the predetermined nominal position, the processor sending data indicative of the moving amount to the display.

2. The miter saw as claimed in claim 1, wherein the detector comprises:

a position sensor for determining if the movable member is positioned at the predetermined nominal position; and an angular sensor for detecting an angular position of the movable member with respect to the base; the miter saw further comprising:

a storage for storing a table including a set of the predetermined nominal position and a corresponding output signal value when the movable member is positioned at the predetermined nominal position.

3. The miter saw as claimed in claim 2, further comprising: a fence fixed to the base and having a contact face for contacting with the workpiece, and wherein the movable member is a turntable rotatably supported by the base and mounting the workpiece thereon with the base, and wherein the moving amount is a rotational amount of the turntable from the reference position.

4. The miter saw as claimed in claim 3, wherein when the turntable is positioned at the position other than the predetermined nominal position and the processor receives an output signal value from the angular sensor, the processor searches for a first set of a first output signal value and a corresponding position from the table, the first output signal value being closest to and higher than the output signal value, the processor searches for a second set of a second output signal value and a corresponding position from the table, the second output signal value being closest to and lower than the output signal value, and the processor computes the rotational amount of the turntable by using an approximation method with the first and second sets.

5. The miter saw as claimed in claim 3, wherein the base has an upper surface on which the workpiece is mounted, the turntable rotating about a rotating axis which is perpendicular to the upper surface of the base, and the angular sensor being provided in a space between the turntable and the rotating axis.

6. The miter saw as claimed in claim 3, wherein the processor sets an angle between the reference position and the predetermined nominal position as the rotational amount when the position sensor senses that the turntable is positioned at the predetermined nominal position.

7. The miter saw as claimed in claim 3, wherein the processor sends the output signal value of the angular sensor in combination with the predetermined nominal position to the storage when the position sensor senses that the turntable is positioned at the predetermined nominal position.

8. The miter saw as claimed in claim 3, wherein the circular saw blade has a rotation axis and a side face extending perpendicularly to the rotation axis, and wherein the turntable has an engaged portion for engaging with the base in order that the side face of the circular saw blade is positioned perpendicularly to the contact face of the fence, and the position sensor detects that the turntable is at the reference position when the engaged portion engages the base.

9. The miter saw as claimed in claim 3, wherein the positioning portion comprises a plurality of slits provided on the turntable, each of the plurality of slits corresponding to the predetermined nominal position; and a lever provided in the base and operable by a user for being engaged in one of the plurality of slits, the position sensor detecting an engagement of the one of the plurality of slits with the lever to output a signal indicating the engagement, and wherein when the position sensor detects the engagement and the processor receives an output signal from the angular sensor, the processor searches for a signal value and a corresponding position from the table, the signal value being the closest value to the output signal value of the angular sensor, and the processor sending to the display data indicative of the predetermined nominal position corresponding to the searched signal value as the rotational amount.

10. The miter saw as claimed in claim 3, wherein the positioning portion comprises a plurality of slits provided on the base, each of the plurality of slits corresponding to the predetermined nominal position; and a lever provided in the turntable and operable by a user for being engaged in one of the plurality of slits, the position sensor detecting an engagement of the one of the plurality of slits with the lever to output a signal indicating the engagement, and wherein when the position sensor detects the engagement and the processor receives an output signal value from the angular sensor, the processor searches for a signal value and a corresponding position from the table, the signal value being the closest value to the output signal of the angular sensor, and the processor sending to the display data indicative of the predetermined nominal position corresponding to the searched signal value as the rotational amount.

11. The miter saw as claimed in claim 3, further comprising a resetting unit for resetting the rotational amount displayed on the display to zero, wherein the processor switches the reference position to another reference position associated with the displayed rotational amount when the resetting unit is activated.

12. The miter saw as claimed in claim 11 wherein when the resetting unit is activated, the processor sends the position data associated with the displayed rotational amount in combination with the corresponding output signal to the storage, and the processor then uses the another reference position as a new reference position to compute the rotational amount.

13. The miter saw as claimed in claim 11, wherein when the resetting unit is activated, the processor shifts a value of the predetermined nominal position in the table stored in the storage to another value by an angle between the reference position and the another reference position.

14. The miter saw as claimed in claim 3, wherein the display is provided on a portion of the turntable facing a user.

15. The miter saw as claimed in claim 2, wherein the movable member is a support having one end pivotally connected to the base and another end supporting and fixing the cutter blade portion, and wherein the moving amount is a tilling amount of the support from the reference position.

16. The miter saw as claimed in claim 15, wherein the base has an upper surface on which the workpiece is mounted, and the support is joined to the base through a turntable, the turntable having a rotating axis perpendicular to the upper surface of the base and being rotatable about the rotating axis with respect to the base, and the turntable mounting the workpiece thereon with the base, and wherein the circular saw blade has a rotation axis and a side face extending perpendicularly to the rotation axis, and wherein the support is joined to the turntable in order that an angle of the side face of the circular saw blade with respect to the upper surface of the base is changeable.

17. The miter saw as claimed in claim 16, wherein the support has an engaged portion for engaging with one of the base and the turntable in order that the side face of the circular saw blade is positioned perpendicularly to the upper surface of the base, the position sensor detects that the support is at the reference position when the engaged portion engages the one of the base and the turntable.

18. The miter saw as claimed in claim 17, wherein the engaged portion is a bolt having a tip portion for an engagement.

19. The miter saw as claimed in claim 16, wherein the reference position is a perpendicular direction to the upper surface of the base, and wherein the support has an engaged portion for engaging with one of the base and the turntable in order that the side face of the circular saw blade is inclined at a maximum angle from the perpendicular direction, and the position sensor determines that the support is engaged with the one of the base and the turntable through the engaged portion.

20. The miter saw as claimed in claim 19, wherein the engaged portion is a bolt having a tip portion for an engagement.

21. The miter saw as claimed in claim 15, wherein the support has a pivot to be rotatably engaged with the base, and wherein the angular sensor detects a pivotally moving amount of the pivot with respect to the base.

22. The miter saw as claimed in claim 15, wherein the base has a pivot to be rotatably engaged with the one end of the support, and wherein the angular sensor detects a pivotally moving amount of the pivot with respect to the support.

23. The miter saw as claimed in claim 15, wherein the position sensor determines and outputs that the support is positioned at the predetermined nominal position, and the processor set an angle between the reference position and the predetermined nominal position as the tilting amount in response to the outputting of the position sensor.

24. The miter saw as claimed in claim 15, wherein the processor sends the output signal of the detector in combination with the predetermined nominal position to the storage to renew the table when the turntable is positioned at the predetermined nominal position.

25. The miter saw as claimed in claim 15, further comprising a resetting unit for resetting the tilting amount displayed on the display to zero, wherein the processor switches the reference position to another reference position associated with the displayed tilting amount when the resetting unit is activated.

26. The miter saw as claimed in claim 25, wherein when the resetting unit is activated, the processor sends the position data associated with the displayed tilting amount in combination with the corresponding output signal to the storage, the processor then switching the reference position to another reference position corresponding the displayed tilting amount, and the processor computing the tilting amount based on the another reference position.

27. The miter saw as claimed in claim 25, wherein the processor shifts a value of the predetermined nominal position in the table stored in the storage to another value by an angle between the reference position and the new reference position when the resetting unit is activated.

28. The miter saw as claimed in claim 15, wherein the display is provided on a portion of the turntable facing a user.

29. The miter saw as claimed in claim 1, further comprising a constant-voltage power supply for applying a constant voltage to the processor and the display.

30. The miter saw as claimed in claim 1, wherein the processor produces a signal for quitting application of the constant voltage from the constant-voltage power supply to the display when the output signal of the detector is maintained at a constant level for more than a predetermined period.

31. The miter saw as claimed in claim 1, further comprising a battery for supplying power to the processor and the display.

32. The miter saw as claimed in claim 1, wherein the display performs any kind of display for a predetermined period in addition to the rotational amount.

33. The miter saw as claimed in claim 1, wherein the detector comprises a rotary encoder for producing a pulse every time the movable member rotates in a predetermined rotary amount, and the predetermined nominal position has a range being an integral multiple of the predetermined rotary amount, wherein the processor computes the moving amount based on the numbers of counted pulses when the movable member is out of the range.

34. The miter saw as claimed in claim 33, further comprising: a fence fixed to the base and having a contact face for contacting with the workpiece, wherein the movable member is a turntable rotatably supported by the base and mounting the workpiece thereon with the base, and wherein the moving amount is a rotational amount of the turntable from the reference position.

35. The miter saw as claimed in claim 33, wherein the movable member is a support having one end pivotally connected to the base and another end supporting and fixing the cutter blade portion, and wherein the moving amount is a tilting amount of the support from the reference position.

36. A miter saw comprising:
a base for mounting a workpiece thereon;
a movable member supported to the base and movable relative to the base;
a cutter blade portion connected to the movable member for rotatably supporting a circular saw blade to cut the workpiece;
a positioning portion associated with the movable member and providing a predetermined nominal position of the movable member with respect to the base, the predetermined nominal position including a reference position and a specific position;

a detector for producing an output signal indicative of a position of the movable member with respect to the base;

a display for displaying a moving amount of the movable member from the reference position;

a storage for storing a table providing a relationship between the predetermined nominal position and the output signal of the detector when the movable member is positioned at the predetermined nominal position; and a processor for computing a measured angle from the reference position on the basis of the output signal from the detector and searching for the predetermined nominal position from the table based on the measured angle, the processor sending data indicating the searched predetermined nominal position to the display.

37. The miter saw as claimed in claim 36, wherein the detector comprises:

a position sensor for determining if the movable member is positioned at the predetermined nominal position; and an angular sensor for detecting an angular position of the movable member with respect to the base; further comprising:

a storage for storing a table including a set of the predetermined nominal position and a corresponding output signal value from the angular sensor when the movable member is positioned at the predetermined nominal position.

38. The miter saw as claimed in claim 37, further comprising: a fence fixed to the base and having a contact face for contacting with the workpiece, wherein the movable member is a turntable rotatably supported by the base and mounting the workpiece thereon with the base, and wherein the moving amount is a rotational amount of the turntable from the reference position.

39. The miter saw as claimed in claim 37, wherein the movable member is a support having one end pivotally connected to the base and another end supporting and fixing the cutter blade portion, and wherein the moving amount is a tilting amount of the support from the reference position.

40. A miter saw comprising:

a base for mounting a workpiece thereon;

a movable member supported to the base and movable relative to the base;

a cutter blade portion connected to the movable member for rotatably supporting a circular saw blade to cut the workpiece;

a positioning portion associated with the movable member and providing a predetermined nominal position of the movable member with respect to the base, the predetermined nominal position including a reference position and a specific position;

a detector for producing an output signal indicative of a position of the movable member with respect to the base, the detector including a position sensor for determining if the movable member is positioned at the predetermined nominal position, and an angular sensor for detecting an angular position of the movable member with respect to the base;

a display for displaying a moving amount of the movable member from the reference position; and a processor comprising means for setting an angle between the reference position and the predetermined nominal position as the moving amount when the movable member is positioned at the predetermined nominal position, means for computing the moving amount based on the output signal from the detector when the movable member is positioned at a position other than the predetermined nominal position, and means for sending data indicative of the moving amount to the display.

41. The miter saw as claimed in claim 40, further comprising a storage for storing a table including a set of the predetermined nominal position and a corresponding output signal of the detector when the movable member is positioned at the predetermined nominal position, wherein the processor further comprises:

means for searching for a first set of a first output signal value and a corresponding position from the table, when the movable member is positioned at the position other than the predetermined nominal position and the angular sensor produces an output signal, the first output signal value being closest to and higher than the output signal value;

means for searching for a second set of a second output signal value and a corresponding position from the table when the movable member is positioned at the position other than the predetermined nominal position and the angular sensor produces the output signal, the second output signal value being closest to and lower than the output signal value, and means for computing the moving amount of the movable member by using an approximation method with the first and second sets when the movable member is positioned at the position other than the predetermined nominal position and the angular sensor produces the output signal.

* * * * *